(12) United States Patent
Watanabe

(10) Patent No.: US 12,066,397 B2
(45) Date of Patent: Aug. 20, 2024

(54) SENSOR ELEMENT AND GAS SENSOR

(71) Applicant: NGK INSULATORS, LTD., Aichi (JP)

(72) Inventor: Yusuke Watanabe, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 117 days.

(21) Appl. No.: 17/205,199

(22) Filed: Mar. 18, 2021

(65) Prior Publication Data

US 2021/0302363 A1 Sep. 30, 2021

(30) Foreign Application Priority Data

Mar. 26, 2020 (JP) ................................. 2020-055969

(51) Int. Cl.
*G01N 27/407* (2006.01)
*G01M 15/10* (2006.01)
*G01N 27/41* (2006.01)

(52) U.S. Cl.
CPC .......... *G01N 27/41* (2013.01); *G01M 15/102* (2013.01); *G01N 27/4072* (2013.01); *G01N 27/4075* (2013.01)

(58) Field of Classification Search
CPC ....... G01N 27/41; G01N 27/407–4072; G01N 27/4075–4077; G01N 27/48; G01N 27/49; G01N 27/409
See application file for complete search history.

(56) References Cited

U.S. PATENT DOCUMENTS

2011/0056270 A1* 3/2011 Reinhardt .......... G01N 27/4071 73/23.31
2018/0284053 A1* 10/2018 Watanabe .......... G01N 27/4071
2018/0284056 A1* 10/2018 Watanabe .......... G01N 27/4067

FOREIGN PATENT DOCUMENTS

| CN | 108693215 A | 10/2018 |
| JP | 2003-107042 A | 4/2003 |
| JP | 2018-169328 A | 11/2018 |
| JP | 2018-173320 B2 | 11/2018 |

OTHER PUBLICATIONS

Japanese Office Action issue in corresponding Japanese Patent Application No. 2020-055969, dated Jul. 11, 2023.
Chinese Office Action issue in corresponding Chinese Patent Application No. 202110279971.4 dated Dec. 4, 2023.

* cited by examiner

*Primary Examiner* — Nicholas A Smith
*Assistant Examiner* — Vivian A Tran
(74) *Attorney, Agent, or Firm* — MATTINGLY & MALUR, PC

(57) ABSTRACT

A sensor element includes an element body provided with a measurement-object gas flow section therein; a measurement electrode disposed in the measurement-object gas flow section; a measurement-object-gas side electrode disposed on the element body; a reference electrode disposed inside the element body; and a reference-gas introduction section having a reference-gas introduction space and a porous reference-gas introduction layer, the reference-gas introduction space introducing a reference gas into the element body, the porous reference-gas introduction layer causing the reference gas to flow from the reference-gas introduction space to the reference electrode. Limiting current A as a limiting current when oxygen is pumped out from a periphery of the reference electrode to a periphery of the measurement-object-gas side electrode is 30 μA or lower, A×Ra as a product of a diffusion resistance Ra [/mm] of the reference-gas introduction space and the limiting current A is 50,000 or smaller.

6 Claims, 8 Drawing Sheets

SENSOR ELEMENT AND GAS SENSOR

The present application claims priority from Japanese Patent Application No. 2020-055969, filed on Mar. 26, 2020, the entire contents of which are incorporated herein by reference.

BACKGROUND OF THE INVENTION

1. Field of the Invention

The present invention relates to sensor elements and gas sensors.

2. Description of the Related Art

A known gas sensor in the related art detects the concentration of a specific gas, such as $NO_x$, in measurement-object gas, such as exhaust gas of an automobile. For example, Patent Literature 1 describes a sensor element serving as a part of a gas sensor. The sensor element includes a layered body having oxygen-ion-conductive solid electrolyte layers, a measurement-object-gas side electrode disposed in a part of the layered body to be exposed to the measurement-object gas, a measurement electrode disposed in a measurement-object gas flow section inside the layered body, a reference electrode disposed inside the layered body, and a porous reference-gas introduction layer that receives a reference gas (e.g., atmospheric gas) serving as a reference for detecting the concentration of the specific gas in the measurement-object gas and causes the reference gas to flow to the reference electrode. The specific gas concentration in the measurement-object gas can be detected based on an electromotive force occurring between the reference electrode and the measurement electrode of this sensor element. Furthermore, the specific gas concentration is measured in a state where the solid electrolyte is activated by heating the sensor element to a predetermined driving temperature (e.g., 800° C.) using a heater contained in the sensor element. Patent Literature 1 describes a configuration in which a cavity having an opening in the rear end surface of the sensor element is provided and the upper surface of the reference-gas introduction layer is exposed to the cavity. Moreover, Patent Literature 1 also describes a configuration in which the sensor element does not have a cavity but has the reference-gas introduction layer exposed at the rear end surface of the sensor element, such that this exposed section serves as an entrance of the reference-gas introduction layer.

CITATION LIST

Patent Literature

PTL 1: JP 2018-173320 A

SUMMARY OF THE INVENTION

During a period in which the sensor element is not driven, the porous reference-gas introduction layer may sometimes adsorb water from the outside. Because the sensor element is heated when the driving is started, the water in the reference-gas introduction layer becomes gas and is released outward from the reference-gas introduction layer. However, until the water is released, the water in the gaseous state exists, sometimes causing the oxygen concentration around the reference electrode to decrease. Thus, the time (referred to as "stabilization period" hereinafter) it takes for the potential of the reference electrode to become stable from when the driving of the sensor element is started is sometimes extended. Especially in a configuration where the sensor element does not have a cavity that exposes the reference-gas introduction layer, the stabilization period tends to become longer. In contrast, in a configuration where the sensor element has a cavity that exposes the reference-gas introduction layer, the diffusion resistance between the outside of the sensor element and the reference electrode is low due to the existence of the cavity. Thus, when the oxygen concentration of the reference gas outside the sensor element decreases while the sensor element is being driven, there is a problem in that the oxygen concentration around the reference electrode is likely to decrease. A case where the oxygen concentration of the reference gas outside the sensor element decreases corresponds to, for example, a case where the measurement-object gas becomes slightly mixed in the reference gas.

The present invention has been made to solve the aforementioned problems, and a main object thereof is to enhance the resistance to a decrease in the oxygen concentration of a reference gas outside a sensor element, and to shorten a stabilization period.

In order to achieve the aforementioned main object, the present invention employs the following solutions.

A sensor element according to the present invention includes an element body, a measurement electrode, a measurement-object-gas side electrode, a reference electrode, a reference-gas introduction section, and a heater. The element body has an oxygen-ion-conductive solid electrolyte layer and is provided with a measurement-object gas flow section therein. The measurement-object gas flow section introduces a measurement-object gas and causes the measurement-object gas to flow therethrough. The measurement electrode is disposed in the measurement-object gas flow section. The measurement-object-gas side electrode is disposed in the element body such that the measurement-object-gas side electrode comes into contact with the measurement-object gas. The reference electrode is disposed inside the element body. The reference-gas introduction section has a reference-gas introduction space and a porous reference-gas introduction layer. The reference-gas introduction space is open outward of the element body and introduces a reference gas serving as a reference for detecting specific gas concentration in the measurement-object gas into the element body. The porous reference-gas introduction layer causes the reference gas to flow from the reference-gas introduction space to the reference electrode. The heater heats the element body. A limiting current A as a limiting current when oxygen is pumped out from a periphery of the reference electrode to a periphery of the measurement-object-gas side electrode is 30 μA or lower. A×Ra as a product of a diffusion resistance Ra [/mm] of the reference-gas introduction space and the limiting current A is 50,000 or smaller.

In this sensor element, the limiting current A when oxygen is pumped out from the periphery of the reference electrode to the periphery of the measurement-object-gas side electrode is 30 μA or lower. This limiting current A has a positive correlation with the reciprocal of the diffusion resistance of the reference-gas introduction section, such that the diffusion resistance of the reference-gas introduction section increases with decreasing limiting current A. With the limiting current A being 30 μA or lower, the diffusion resistance of the reference-gas introduction section is sufficiently high, so that a decrease in the oxygen concentration around the reference electrode can be suppressed even when the oxygen concentration of the reference gas surrounding the sensor element decreases. Specifically, the resistance to a decrease in the oxygen concentration of the reference gas outside the sensor element is enhanced. Furthermore, in this sensor element, A×Ra as a product of the diffusion resistance Ra of the reference-gas introduction space and the limiting current A is 50,000 or smaller. As mentioned above, since the limiting current A has a positive correlation with the reciprocal of the diffusion resistance of the reference-gas introduction section, A×Ra has a positive correlation with the percentage of the diffusion resistance Ra of the reference-gas introduction space occupying the diffusion resistance of the reference-gas introduction section. With A×Ra being 50,000 or smaller, the percentage of the diffusion resistance Ra of the reference-gas introduction space occupying the diffusion resistance of the reference-gas introduction section is sufficiently low, so that water adsorbed into the reference-gas introduction layer when the sensor element is not driven passes through the reference-gas introduction space and is readily diffused outward from the sensor element during the driving of the sensor element. Therefore, the stabilization period of the sensor element can be shortened. Accordingly, with the limiting current A being 30 μA or lower and A×Ra being 50,000 or smaller in this sensor element, the resistance to a decrease in the oxygen concentration of the reference gas outside the sensor element is enhanced, and the stabilization period for the potential of the reference electrode during the driving of the sensor element is shortened.

In the sensor element according to the present invention, an exposed area S as an area of a part of the reference-gas introduction layer exposed to the reference-gas introduction space may be 10 mm$^2$ or larger. With the exposed area S being 10 mm$^2$ or larger, the water in the reference-gas introduction layer can be readily diffused to the reference-gas introduction space, so that the stabilization period is likely to become shorter.

In the sensor element according to the present invention, a volume ratio Cp/Ca of a volume Cp of the reference-gas introduction layer to a volume Ca of the reference-gas introduction space may be 0.87 or lower. With the volume ratio Cp/Ca being 0.87 or lower, the volume Ca of the reference-gas introduction space is relatively large, so that the diffusion resistance Ra can be reduced, thereby readily setting A×Ra to 50,000 or smaller.

In the sensor element according to the present invention, the limiting current A may be 20 μA or lower. Accordingly, the resistance to a decrease in the oxygen concentration of the reference gas outside the sensor element can be further enhanced.

In the sensor element according to the present invention, a porosity P of the reference-gas introduction layer may be between 1% and 30% inclusive. With the porosity P being 1% or higher, the reference gas can reach the reference electrode. With the porosity P being 30% or lower, the amount of water adsorbed in the reference-gas introduction layer can be reduced, so that the stabilization period is likely to become shorter.

In the sensor element according to the present invention, A×Ra may be 41,000 or smaller. Accordingly, the stabilization period can be further shortened.

A gas sensor according to the present invention includes the sensor element according to any one of the above aspects. Therefore, this gas sensor achieves advantages similar to those of the aforementioned sensor element according to the present invention, such as enhanced resistance to a decrease in the oxygen concentration of the reference gas outside the sensor element and a shorter stabilization period for the potential of the reference electrode during the driving of the sensor element.

DETAILED DESCRIPTION OF THE INVENTION

Figure 1:
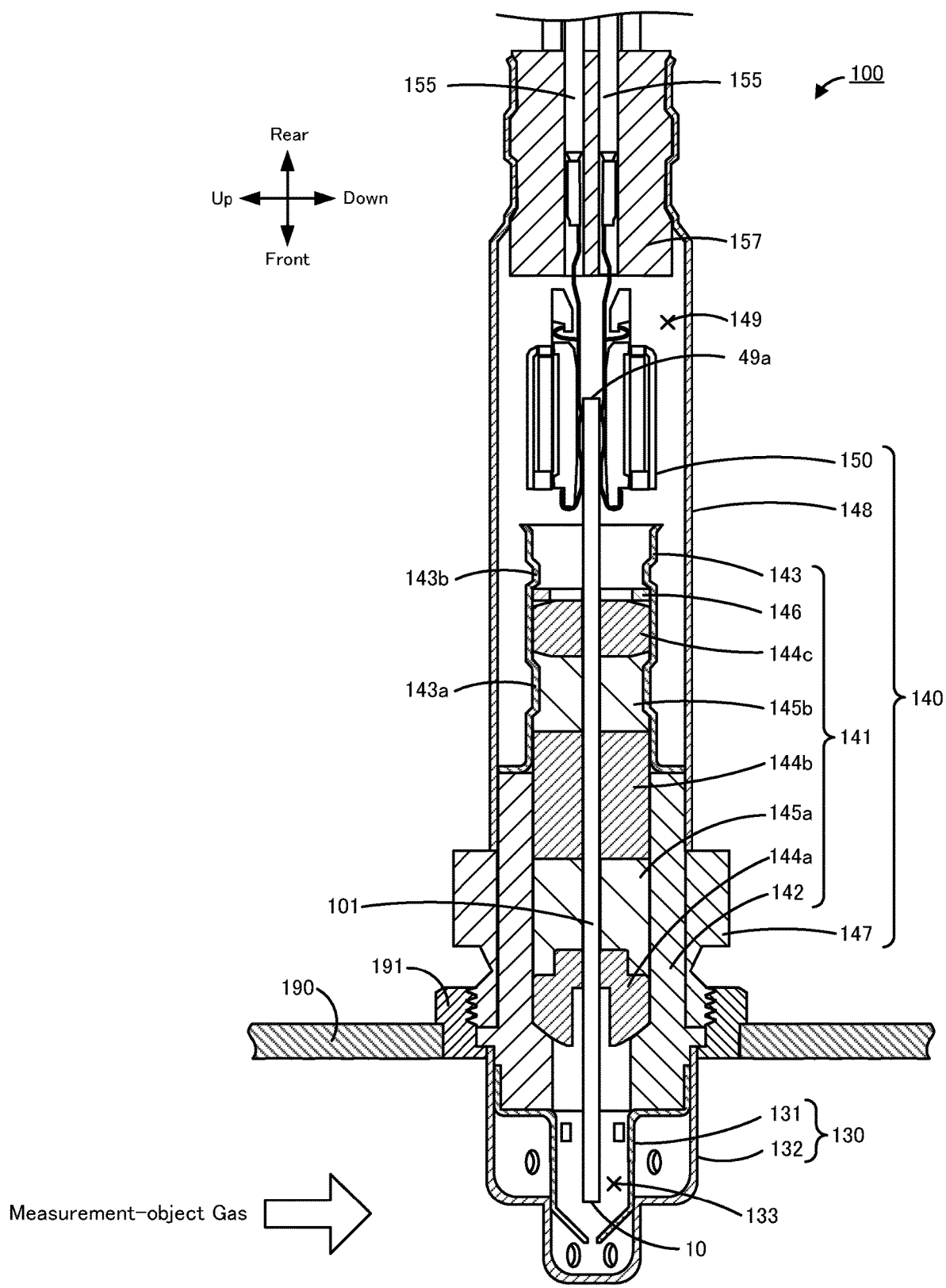
FIG. 1 is a vertical sectional view of a gas sensor 100.
Figure 2:
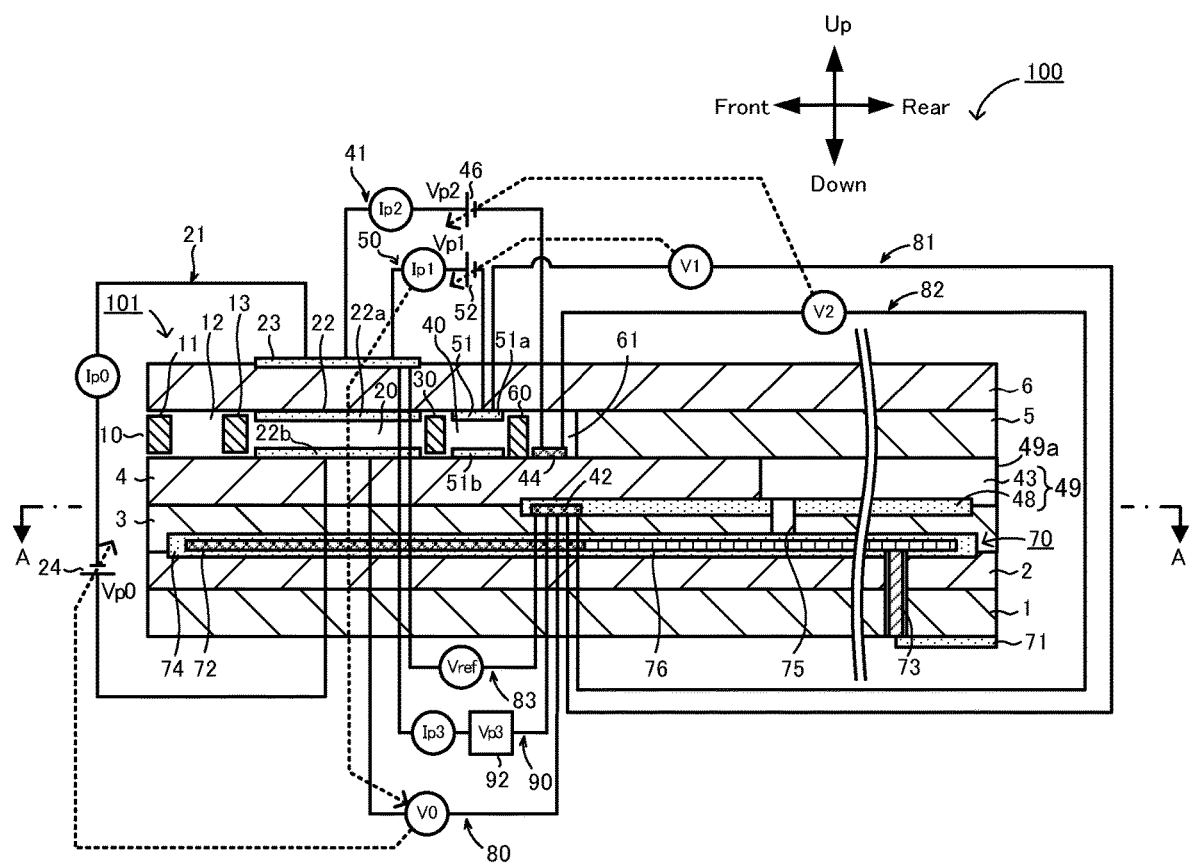
FIG. 2 is a schematic cross-sectional view schematically illustrating an example of the configuration of a sensor element 101.
Figure 3:
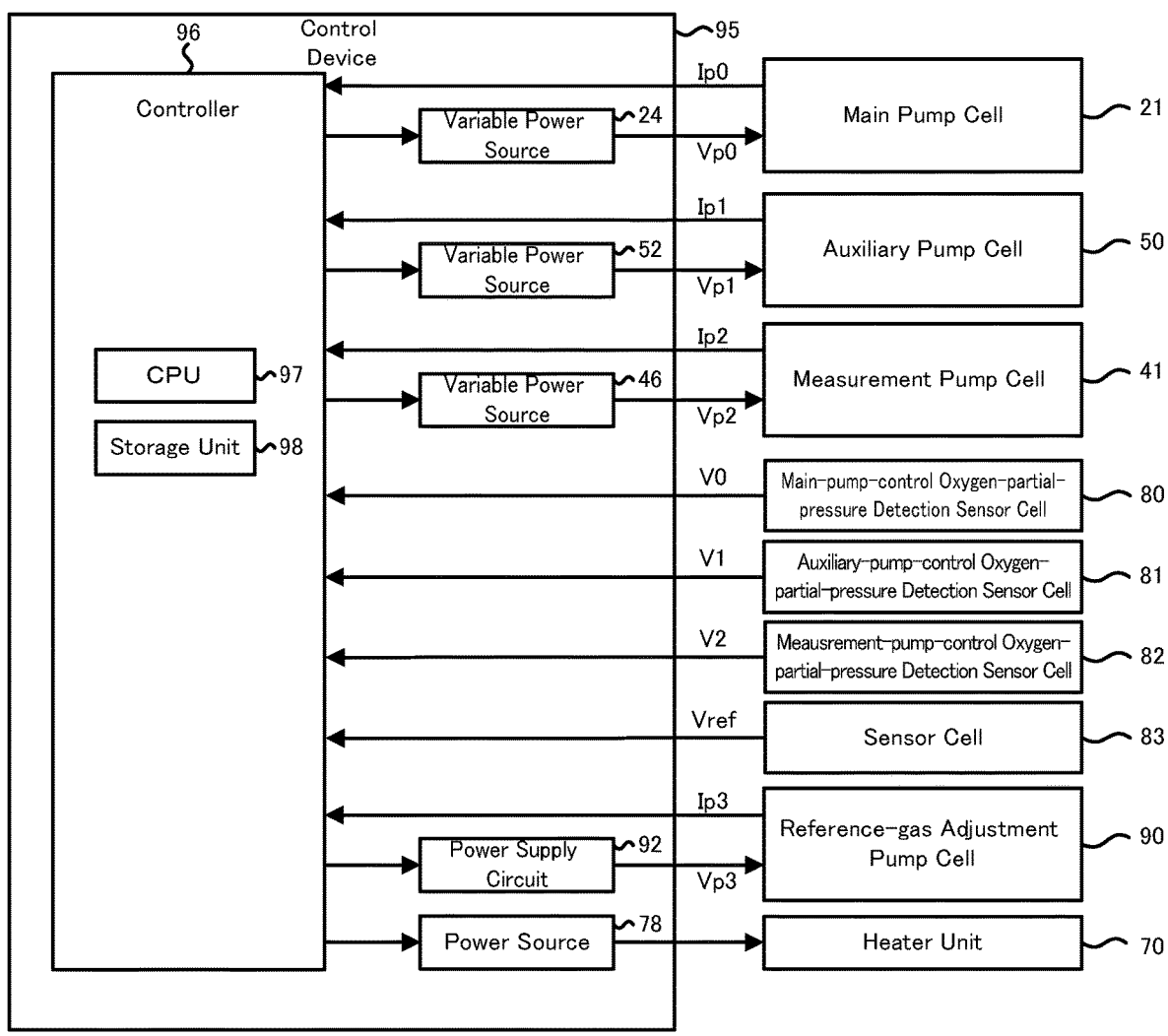
FIG. 3 is a block diagram illustrating an electrical connection relationship between a control device 95 and each cell.
Figure 4:
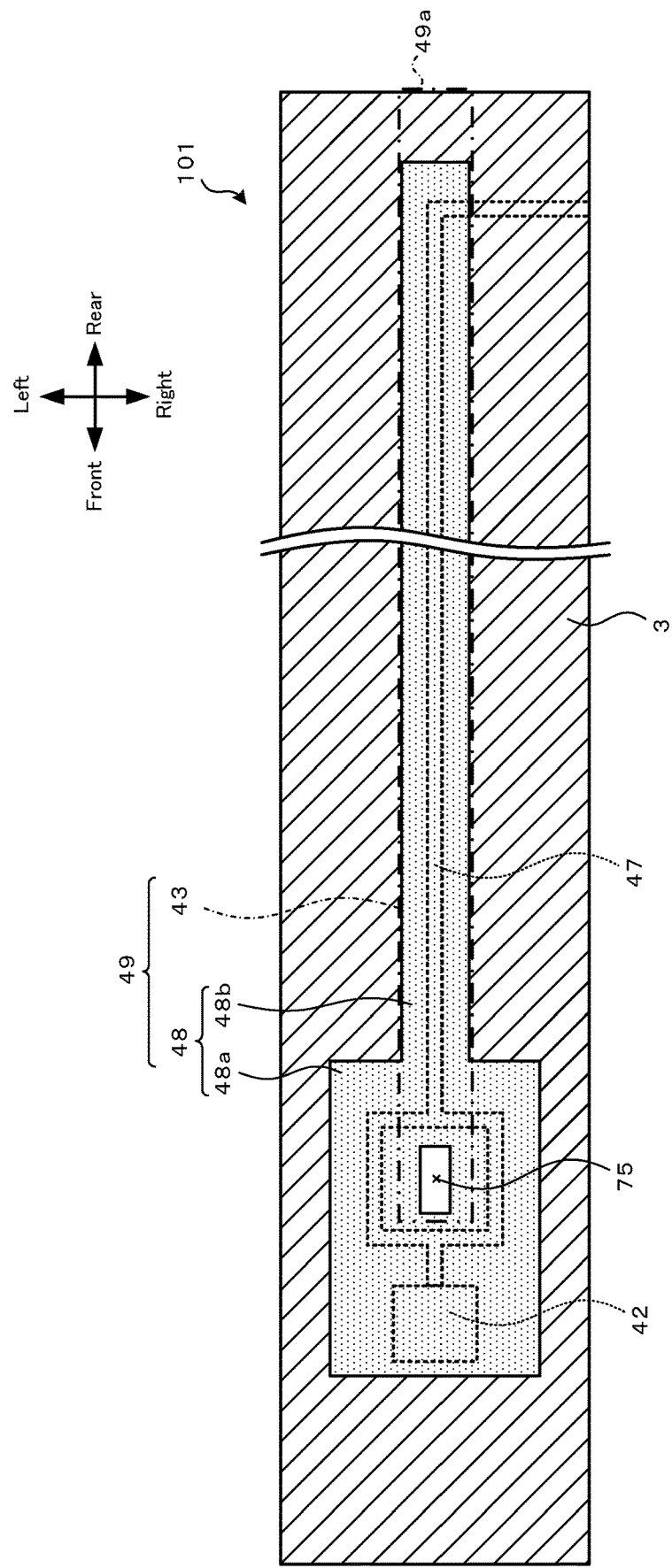
FIG. 4 is a cross-sectional view taken along line A-A in FIG. 2.

Next, embodiments of the present invention will be described with reference to the drawings. FIG. 1 is a vertical sectional view of a gas sensor 100 according to an embodiment of the present invention. FIG. 2 is a schematic cross-sectional view schematically illustrating an example of the configuration of a sensor element 101 included in the gas sensor 100. FIG. 3 is a block diagram illustrating an electrical connection relationship between a control device 95 and each cell. FIG. 4 is a cross-sectional view taken along line A-A in FIG. 2. The sensor element 101 has a long rectangular-prismatic shape. The longitudinal direction (i.e., the left-right direction in FIG. 2) of the sensor element 101 is defined as a front-rear direction, and the thickness direction (i.e., the up-down direction in FIG. 2) of the sensor element 101 is defined as an up-down direction. Furthermore, the width direction (i.e., a direction orthogonal to the front-rear direction and the up-down direction) of the sensor element 101 is defined as a left-right direction.

As shown in FIG. 1, the gas sensor 100 includes the sensor element 101, a protection cover 130 that protects the front end of the sensor element 101, and a sensor assembly 140 including a connector 150 conductive with the sensor element 101. The gas sensor 100 is attached to a pipe 190, such as an exhaust gas pipe of a vehicle, as shown in the drawing, and is used for measuring the concentration of a specific gas, such as $NO_x$ or $O_2$, contained in exhaust gas as a measurement-object gas. In this embodiment, the gas sensor 100 measures the $NO_x$ concentration as the specific gas concentration.

The protection cover 130 includes a bottomed cylindrical inner protection cover 131 that covers the front end of the sensor element 101, and a bottomed cylindrical outer protection cover 132 that covers the inner protection cover 131. The inner protection cover 131 and the outer protection cover 132 each have a plurality of holes for causing the measurement-object gas to flow into the protection cover 130. A sensor element chamber 133 is provided as a space surrounded by the inner protection cover 131, and the front end of the sensor element 101 is disposed in this sensor element chamber 133.

The sensor assembly 140 includes an element sealing unit 141 that seals and secures the sensor element 101, a bolt 147 attached to the element sealing unit 141, an outer cylinder 148, and the connector 150 that is in contact with and electrically connected to connector electrodes (not shown) provided on surfaces (i.e., upper and lower surfaces) at the rear end of the sensor element 101 (only a heater connector electrode 71 to be described later is shown in FIG. 2).

The element sealing unit 141 includes a cylindrical main fitting 142, a cylindrical inner cylinder 143 welded and secured coaxially to the main fitting 142, and ceramic supporters 144a to 144c, green compacts 145a and 145b, and a metal ring 146 that are sealed in a through-hole within the main fitting 142 and the inner cylinder 143. The sensor element 101 is located on the central axis of the element sealing unit 141 and extends through the element sealing unit 141 in the front-rear direction. The inner cylinder 143 has a reduced-diameter section 143a for pressing the green compact 145b toward the central axis of the inner cylinder 143 and a reduced-diameter section 143b for pressing the ceramic supporters 144a to 144c and the green compacts 145a and 145b forward via the metal ring 146. The green compacts 145a and 145b are compressed between the main fitting 142, the inner cylinder 143, and the sensor element 101 by the pressing forces from the reduced-diameter sections 143a and 143b, so that the green compacts 145a and 145b seal between the sensor element chamber 133 in the protection cover 130 and a space 149 in the outer cylinder 148, and also secure the sensor element 101.

The bolt 147 is secured coaxially to the main fitting 142 and has a male threaded section around the outer peripheral surface thereof. The male threaded section of the bolt 147 is inserted into a securing member 191 having a female threaded section in the inner peripheral surface thereof and welded to the pipe 190. Accordingly, the gas sensor 100 is secured to the pipe 190 in a state where the front end of the sensor element 101 and a part of the protection cover 130 of the gas sensor 100 protrude into the pipe 190.

The outer cylinder 148 covers the inner cylinder 143, the sensor element 101, and the connector 150, and a plurality of lead wires 155 connected to the connector 150 are routed outward from the rear end. The lead wires 155 are conductive with electrodes (to be described later) of the sensor element 101 via the connector 150. A gap between the outer cylinder 148 and the lead wires 155 is sealed by a rubber stopper 157. The space 149 in the outer cylinder 148 is filled with a reference gas (i.e., atmospheric gas in this embodiment). The rear end of the sensor element 101 is disposed in this space 149.

As shown in FIG. 2, the sensor element 101 has a layered body obtained by stacking six layers, namely, a first substrate layer 1, a second substrate layer 2, a third substrate layer 3, a first solid electrolyte layer 4, a spacer layer 5, and a second solid electrolyte layer 6 that are formed of oxygen-ion-conductive solid electrolyte layers composed of, for example, zirconia ($ZrO_2$), in that order from below in the drawing. The solid electrolyte used for forming each of these six layers is dense and hermetic. For example, the sensor element 101 is manufactured by performing predetermining processing and printing of a circuit pattern on ceramic green sheets corresponding to the individual layers, subsequently stacking the sheets, and then combining the sheets by calcination.

At one end (i.e., left end in FIG. 2) of the sensor element 101, a gas inlet 10, a first diffusion controlling section 11, a buffer space 12, a second diffusion controlling section 13, a first internal cavity 20, a third diffusion controlling section 30, a second internal cavity 40, a fourth diffusion controlling section 60, and a third internal cavity 61 are provided next to one another between the lower surface of the second solid electrolyte layer 6 and the upper surface of the first solid electrolyte layer 4 in a conductive manner in that order.

The gas inlet 10, the buffer space 12, the first internal cavity 20, the second internal cavity 40, and the third internal cavity 61 are spaces formed inside the sensor element 101 by hollowing out the spacer layer 5 and each have an upper side defined by the lower surface of the second solid electrolyte layer 6, a lower side defined by the upper surface of the first solid electrolyte layer 4, and lateral sides defined by the side surfaces of the spacer layer 5.

The first diffusion controlling section 11, the second diffusion controlling section 13, and the third diffusion controlling section 30 are each provided as two horizontally-long slits (the openings of which extend longitudinally in a direction orthogonal to the drawing). The fourth diffusion controlling section 60 is provided as a single horizontally-long slit (the opening of which extends longitudinally in the direction orthogonal to the drawing) serving as a gap with respect to the lower surface of the second solid electrolyte layer 6. A section extending from the gas inlet 10 to the third internal cavity 61 is also referred to as a measurement-object gas flow section.

The sensor element 101 includes a reference-gas introduction section 49 that allows the reference gas to flow from outside the sensor element 101 to a reference electrode 42 when the $NO_x$ concentration is to be measured. The reference-gas introduction section 49 has a reference-gas introduction space 43 and a reference-gas introduction layer 48. The reference-gas introduction space 43 is provided inward from the rear end surface of the sensor element 101. The reference-gas introduction space 43 is provided at a position between the upper surface of the third substrate layer 3 and the lower surface of the spacer layer 5 and has lateral sides defined by the side surfaces of the first solid electrolyte layer 4. The reference-gas introduction space 43 has an opening at the rear end surface of the sensor element 101, and this opening functions as an entrance 49a for the reference-gas introduction section 49. The entrance 49a is exposed to the space 149 (see FIG. 1). The reference gas is introduced into the reference-gas introduction space 43 through this entrance 49a. The reference-gas introduction section 49 introduces the reference gas to the reference electrode 42 while applying a predetermined diffusion resistance to the reference gas introduced through the entrance 49a. In this embodiment, the reference gas is the atmospheric gas (i.e., atmosphere in the space 149 in FIG. 1).

The reference-gas introduction layer 48 is provided between the upper surface of the third substrate layer 3 and the lower surface of the first solid electrolyte layer 4. The reference-gas introduction layer 48 is a porous body composed of a ceramic material, such as alumina. The upper surface of the reference-gas introduction layer 48 is partially exposed to the reference-gas introduction space 43. The reference-gas introduction layer 48 is provided to cover the reference electrode 42. The reference-gas introduction layer 48 allows the reference gas to flow from the reference-gas introduction space 43 to the reference electrode 42.

The reference electrode 42 is interposed between the upper surface of the third substrate layer 3 and the first solid electrolyte layer 4 and is surrounded by the reference-gas introduction layer 48 connected to the reference-gas introduction space 43, as mentioned above. Furthermore, as will be described later, the reference electrode 42 can be used for measuring the oxygen concentration (oxygen partial pressure) in the first internal cavity 20, the second internal cavity 40, and the third internal cavity 61. The reference electrode 42 is provided as a porous cermet electrode (e.g., a cermet electrode composed of Pt and $ZrO_2$).

In the measurement-object gas flow section, the gas inlet 10 is open to an external space, such that the measurement-object gas is taken into the sensor element 101 from the external space through the gas inlet 10. The first diffusion controlling section 11 applies a predetermined diffusion resistance to the measurement-object gas taken in through the gas inlet 10. The buffer space 12 is provided for guiding the measurement-object gas introduced by the first diffusion controlling section 11 to the second diffusion controlling section 13. The second diffusion controlling section 13 applies a predetermined diffusion resistance to the measurement-object gas introduced to the first internal cavity 20 from the buffer space 12. When the measurement-object gas is to be introduced to the first internal cavity 20 from outside the sensor element 101, the measurement-object gas quickly taken into the sensor element 101 through the gas inlet 10 due to pressure fluctuation (i.e., pulsation of exhaust pressure if the measurement-object gas is exhaust gas of an automobile) of the measurement-object gas in the external space is not directly introduced to the first internal cavity 20 but is introduced to the first internal cavity 20 after the pressure fluctuation of the measurement-object gas is negated by traveling through the first diffusion controlling section 11, the buffer space 12, and the second diffusion controlling section 13. Accordingly, the pressure fluctuation of the measurement-object gas to be introduced to the first internal cavity 20 can be made substantially negligible. The first internal cavity 20 is provided as a space for adjusting the oxygen partial pressure in the measurement-object gas introduced via the second diffusion controlling section 13. The oxygen partial pressure is adjusted by actuating a main pump cell 21.

The main pump cell 21 is an electrochemical pump cell constituted of an inner pump electrode 22 having a ceiling electrode 22a provided substantially over the entire lower surface of the second solid electrolyte layer 6 facing the first internal cavity 20, an outer pump electrode 23 provided in a region corresponding to the ceiling electrode 22a on the upper surface of the second solid electrolyte layer 6 in a manner such that the outer pump electrode 23 is exposed to the external space (i.e., the sensor element chamber 133 in FIG. 1), and the second solid electrolyte layer 6 interposed between these electrodes.

The inner pump electrode 22 is provided astride the upper and lower solid electrolyte layers (i.e., the second solid electrolyte layer 6 and the first solid electrolyte layer 4) that define the first internal cavity 20, and the spacer layer 5 that provides sidewalls. In detail, the lower surface of the second solid electrolyte layer 6 that provides a ceiling surface for the first internal cavity 20 is provided with the ceiling electrode 22a, the upper surface of the first solid electrolyte layer 4 that provides a bottom surface is provided with a bottom electrode 22b, and side electrodes (not shown) connecting the ceiling electrode 22a and the bottom electrode 22b are provided on sidewalls (inner surfaces) of the spacer layer 5 that serve as opposite sidewalls for the first internal cavity 20, such that the inner pump electrode 22 is disposed in a tunnel-like structure in a region where the side electrodes are arranged.

The inner pump electrode 22 and the outer pump electrode 23 are provided as porous cermet electrodes (e.g., cermet electrodes composed of Pt and $ZrO_2$ and containing 1% of Au). The inner pump electrode 22 that comes into contact with the measurement-object gas is formed by using a material with a lowered reduction ability against the $NO_x$ component in the measurement-object gas.

In the main pump cell 21, a desired pump voltage Vp0 is applied between the inner pump electrode 22 and the outer pump electrode 23 so that a pump current Ip0 flows in the positive direction or the negative direction between the inner pump electrode 22 and the outer pump electrode 23, whereby the oxygen in the first internal cavity 20 can be pumped out to the external space or the oxygen in the external space can be pumped into the first internal cavity 20.

Furthermore, in order to detect the oxygen concentration (oxygen partial pressure) in the atmosphere within the first internal cavity 20, the inner pump electrode 22, the second solid electrolyte layer 6, the spacer layer 5, the first solid electrolyte layer 4, the third substrate layer 3, and the reference electrode 42 constitute an electrochemical sensor cell, that is, a main-pump-control oxygen-partial-pressure detection sensor cell 80.

The oxygen concentration (oxygen partial pressure) in the first internal cavity 20 can be determined by measuring an electromotive force (voltage V0) in the main-pump-control oxygen-partial-pressure detection sensor cell 80. Furthermore, feedback control is performed on the pump voltage Vp0 of a variable power source 24 so that the voltage V0 becomes a target value, whereby the pump current Ip0 is controlled. Accordingly, the oxygen concentration in the first internal cavity 20 can be maintained at a predetermined fixed value.

The third diffusion controlling section 30 applies a predetermined diffusion resistance to the measurement-object gas, the oxygen concentration (oxygen partial pressure) of which has been controlled in the first internal cavity 20 in accordance with the operation of the main pump cell 21, and guides the measurement-object gas to the second internal cavity 40.

The second internal cavity 40 is provided as a space where an auxiliary pump cell 50 further adjusts the oxygen partial pressure of the measurement-object gas that has preliminarily undergone oxygen concentration (oxygen partial pressure) adjustment in the first internal cavity 20 and that has subsequently been introduced via the third diffusion controlling section 30. Accordingly, the oxygen concentration in the second internal cavity 40 can be maintained at a fixed level with high accuracy, thereby allowing for highly-accurate $NO_x$ concentration measurement in the gas sensor 100.

The auxiliary pump cell 50 is an auxiliary electrochemical pump cell constituted of an auxiliary pump electrode 51 having a ceiling electrode 51a provided substantially over the entire lower surface of the second solid electrolyte layer 6 facing the second internal cavity 40, the outer pump electrode 23 (but not limited to the outer pump electrode 23 and may possibly be an appropriate electrode at the outer side of the sensor element 101), and the second solid electrolyte layer 6.

The auxiliary pump electrode 51 is disposed within the second internal cavity 40 in a tunnel-like structure similar to the aforementioned inner pump electrode 22 provided in the first internal cavity 20. Specifically, the tunnel-like structure is provided such that the second solid electrolyte layer 6 that provides a ceiling surface for the second internal cavity 40 is provided with the ceiling electrode 51a, the first solid electrolyte layer 4 that provides a bottom surface for the second internal cavity 40 is provided with a bottom electrode 51b, and side electrodes (not shown) that connect the ceiling electrode 51a and the bottom electrode 51b are provided on opposite wall surfaces of the spacer layer 5 that provide sidewalls for the second internal cavity 40. The auxiliary pump electrode 51 is similar to the inner pump electrode 22 in being formed by using a material with a lowered reduction ability against the $NO_x$ component in the measurement-object gas.

In the auxiliary pump cell 50, a desired voltage Vp1 is applied between the auxiliary pump electrode 51 and the outer pump electrode 23 so that the oxygen in the atmosphere within the second internal cavity 40 can be pumped out to the external space or the oxygen can be pumped into the second internal cavity 40 from the external space.

Furthermore, in order to control the oxygen partial pressure in the atmosphere within the second internal cavity 40, the auxiliary pump electrode 51, the reference electrode 42, the second solid electrolyte layer 6, the spacer layer 5, the first solid electrolyte layer 4, and the third substrate layer 3 constitute an electrochemical sensor cell, that is, an auxiliary-pump-control oxygen-partial-pressure detection sensor cell 81.

The auxiliary pump cell 50 performs pumping in accordance with a variable power source 52 that is voltage-controlled based on an electromotive force (voltage V1) detected by the auxiliary-pump-control oxygen-partial-pressure detection sensor cell 81. Accordingly, the oxygen partial pressure in the atmosphere within the second internal cavity 40 is controlled to a low partial pressure that substantially has no effect on $NO_x$ measurement.

In addition, a pump current Ip1 is used for controlling the electromotive force of the main-pump-control oxygen-partial-pressure detection sensor cell 80. In detail, the pump current Ip1 is input as a control signal to the main-pump-control oxygen-partial-pressure detection sensor cell 80, and the voltage V0 is controlled to the aforementioned target value, whereby the gradient of the oxygen partial pressure in the measurement-object gas introduced to the second internal cavity 40 from the third diffusion controlling section 30 is controlled such that the gradient is constantly fixed. When the gas sensor 100 is used as a $NO_x$ sensor, the oxygen concentration within the second internal cavity 40 is maintained at a fixed value of about 0.001 ppm in accordance with the functions of the main pump cell 21 and the auxiliary pump cell 50.

The fourth diffusion controlling section 60 applies a predetermined diffusion resistance to the measurement-object gas, the oxygen concentration (oxygen partial pressure) of which has been controlled in the second internal cavity 40 in accordance with the operation of the auxiliary pump cell 50, and guides the measurement-object gas to the third internal cavity 61. The fourth diffusion controlling section 60 has a role of limiting the amount of $NO_x$ flowing into the third internal cavity 61.

The third internal cavity 61 is provided as a space where a process for measuring the nitrogen oxide ($NO_x$) concentration in the measurement-object gas is performed on the measurement-object gas that has preliminarily undergone oxygen concentration (oxygen partial pressure) adjustment in the second internal cavity 40 and that has subsequently been introduced via the fourth diffusion controlling section 60. The $NO_x$ concentration is measured mainly in the third internal cavity 61 in accordance with the operation of a measurement pump cell 41.

The measurement pump cell 41 measures the $NO_x$ concentration in the measurement-object gas within the third internal cavity 61. The measurement pump cell 41 is an electrochemical pump cell constituted of a measurement electrode 44 provided on the upper surface of the first solid electrolyte layer 4 facing the third internal cavity 61, the outer pump electrode 23, the second solid electrolyte layer 6, the spacer layer 5, and the first solid electrolyte layer 4. The measurement electrode 44 is a porous cermet electrode composed of a material with a higher reduction ability against the $NO_x$ component in the measurement-object gas than the inner pump electrode 22. The measurement electrode 44 also functions as a $NO_x$ reduction catalyst that reduces the $NO_x$ existing in the atmosphere within the third internal cavity 61.

In the measurement pump cell 41, oxygen produced as a result of decomposition of the nitrogen oxide in the atmosphere surrounding the measurement electrode 44 is pumped out, and the amount of oxygen produced can be detected as a pump current Ip2.

Furthermore, in order to detect the oxygen partial pressure around the measurement electrode 44, the first solid electrolyte layer 4, the third substrate layer 3, the measurement electrode 44, and the reference electrode 42 constitute an electrochemical sensor cell, that is, a measurement-pump-control oxygen-partial-pressure detection sensor cell 82. A variable power source 46 is controlled based on an electromotive force (voltage V2) detected by the measurement-pump-control oxygen-partial-pressure detection sensor cell 82.

The measurement-object gas introduced to the second internal cavity 40 reaches the measurement electrode 44 in the third internal cavity 61 via the fourth diffusion controlling section 60 under a condition where the oxygen partial pressure is controlled. The nitrogen oxide in the measurement-object gas surrounding the measurement electrode 44 is reduced ($2NO \rightarrow N_2 + O_2$), so that oxygen is produced. Then, the produced oxygen is to undergo pumping by the measurement pump cell 41. During the pumping of the oxygen, a voltage Vp2 of the variable power source 46 is controlled such that the voltage V2 detected by the measurement-pump-control oxygen-partial-pressure detection sensor cell 82 is a fixed value (i.e., a target value). Because the amount of oxygen produced around the measurement electrode 44 is proportional to the concentration of the nitrogen oxide in the measurement-object gas, the nitrogen oxide concentration in the measurement-object gas is calculated by using the pump current Ip2 in the measurement pump cell 41.

Furthermore, the second solid electrolyte layer 6, the spacer layer 5, the first solid electrolyte layer 4, the third substrate layer 3, the outer pump electrode 23, and the reference electrode 42 constitute an electrochemical sensor cell 83. The oxygen partial pressure in the measurement-object gas outside the sensor can be detected in accordance with an electromotive force (voltage Vref) obtained by the sensor cell 83.

Moreover, the second solid electrolyte layer 6, the spacer layer 5, the first solid electrolyte layer 4, the third substrate layer 3, the outer pump electrode 23, and the reference electrode 42 constitute an electrochemical reference-gas adjustment pump cell 90. The reference-gas adjustment pump cell 90 performs oxygen pumping by receiving a control current (i.e., an oxygen pump current) Ip3 flowing in accordance with a control voltage Vp3 applied by a power supply circuit 92 connected between the outer pump electrode 23 and the reference electrode 42. Accordingly, the reference-gas adjustment pump cell 90 pumps in oxygen around the reference electrode 42 from the space (i.e., the sensor element chamber 133 in FIG. 1) surrounding the outer pump electrode 23.

In the gas sensor 100 having the above configuration, the measurement pump cell 41 receives the measurement-object gas whose oxygen partial pressure is constantly maintained at a fixed low value (i.e., a value that substantially has no effect on $NO_x$ measurement) as a result of actuation of the main pump cell 21 and the auxiliary pump cell 50. Thus, the $NO_x$ concentration in the measurement-object gas can be ascertained based on the pump current Ip2 flowing as a result of oxygen produced by $NO_x$ reduction being pumped out by the measurement pump cell 41 substantially in proportion to the $NO_x$ concentration in the measurement-object gas.

Furthermore, in order to enhance oxygen ion conductivity of the solid electrolyte, the sensor element 101 includes a heater unit 70 having a role of temperature adjustment for keeping the sensor element 101 warm by heating the sensor element 101. The heater unit 70 includes a heater connector electrode 71, a heater 72, a through-hole 73, a heater insulation layer 74, a pressure release hole 75, and a lead wire 76.

The heater connector electrode 71 is provided in contact with the lower surface of the first substrate layer 1. By being connected to an external power source, the heater connector electrode 71 can supply electricity to the heater unit 70 from the outside.

The heater 72 is an electrical resistor interposed between the second substrate layer 2 and the third substrate layer 3 from above and below. The heater 72 is connected to the heater connector electrode 71 via the lead wire 76 and the through-hole 73, and generates heat by being supplied with electricity from the outside via the heater connector electrode 71, thereby heating and maintaining the temperature of the solid electrolyte constituting the sensor element 101.

Furthermore, the heater 72 is embedded in the entire region from the first internal cavity 20 to the third internal cavity 61, and is capable of adjusting the entire sensor element 101 to a temperature at which the aforementioned solid electrolyte is activated.

The heater insulation layer 74 is a porous-alumina insulation layer provided on the upper and lower surfaces of the heater 72 and formed of an insulator composed of, for example, alumina. The heater insulation layer 74 is provided for the purpose of obtaining electrical insulation between the second substrate layer 2 and the heater 72, as well as electrical insulation between the third substrate layer 3 and the heater 72.

The pressure release hole 75 extends through the third substrate layer 3 and the reference-gas introduction layer 48 and is provided for the purpose of alleviating an increase in internal pressure occurring due to a temperature increase in the heater insulation layer 74.

As shown in FIG. 3, the control device 95 includes the aforementioned variable power sources 24, 46, and 52, a heater power source 78, the aforementioned power supply circuit 92, and a controller 96. The controller 96 is a microprocessor including a CPU 97, a RAM (not shown), and a storage unit 98. The storage unit 98 is a nonvolatile memory, such as a ROM, and stores various types of data. The controller 96 receives the voltages V0 to V2 and the voltage Vref from the sensor cells 80 to 83. The controller 96 receives the pump currents Ip0 to Ip2 and the pump current Ip3 flowing through the pump cells 21, 50, 41, and 90. The controller 96 outputs control signals to the variable power sources 24, 46, and 52 and the power supply circuit 92 so as to control the voltages Vp0 to Vp3 output by the variable power sources 24, 46, and 52 and the power supply circuit 92, thereby controlling the pump cells 21, 41, 50, and 90. The controller 96 outputs a control signal to the heater power source 78 so as to control the electric power supplied to the heater 72 by the heater power source 78, thereby adjusting the temperature of the sensor element 101. The storage unit 98 stores therein, for example, target values V0*, V1*, V2*, Ip1* to be described below.

The controller 96 performs feedback control on the pump voltage Vp0 of the variable power source 24 so as to set the voltage V0 to the target value V0* (i.e., to set the oxygen concentration in the first internal cavity 20 to a target concentration).

The controller 96 performs feedback control on the voltage Vp1 of the variable power source 52 so as to set the voltage V1 to a fixed value (referred to as "target value V1*") (i.e., to set the oxygen concentration in the second internal cavity 40 to a predetermined low oxygen concentration that substantially has no effect on $NO_x$ measurement). In addition, the controller 96 sets (i.e., performs feedback control on) the target value V0* of the voltage V0 based on the pump current Ip1 so as to set the pump current Ip1 flowing in accordance with the voltage Vp1 to a fixed value (referred to as "target value Ip1*"). Accordingly, the gradient of the oxygen partial pressure in the measurement-object gas introduced to the second internal cavity 40 from the third diffusion controlling section 30 is constantly fixed. Moreover, the oxygen partial pressure in the atmosphere within the second internal cavity 40 is controlled to a low partial pressure that substantially has no effect on $NO_x$ measurement. The target value V0* is set to a value at which the oxygen concentration in the first internal cavity 20 is higher than 0% and is a low oxygen concentration.

The controller 96 performs feedback control on the voltage Vp2 of the variable power source 46 so as to set the voltage V2 to a fixed value (referred to as "target value V2*") (i.e., to set the oxygen concentration in the third internal cavity 61 to a predetermined low concentration). Thus, oxygen produced as a result of a specific gas (in this case, $NO_x$) in the measurement-object gas being reduced in the third internal cavity 61 is pumped out from the third internal cavity 61 such that the oxygen becomes substantially zero. Then, the controller 96 acquires the pump current Ip2 as a detection value according to the oxygen produced in the third internal cavity 61 from $NO_x$, and calculates the $NO_x$ concentration in the measurement-object gas based on the pump current Ip2. The target value V2* is preliminarily set as a value at which the pump current Ip2 flowing in accordance with the feedback-controlled voltage Vp2 serves as a limiting current. The storage unit 98 stores therein, for example, a relational expression (e.g., a linear function expression) or a map as a correspondence relationship between the pump current Ip2 and the $NO_x$ concentration. Such a relational expression or a map can be preliminarily obtained from tests. Then, the controller 96 detects the $NO_x$ concentration in the measurement-object gas based on the acquired pump current Ip2 and the aforementioned correspondence relationship stored in the storage unit 98.

The controller 96 controls the power supply circuit 92 to apply the control voltage Vp3 to the reference-gas adjustment pump cell 90, thereby causing the pump current Ip3 to flow. In this embodiment, the control voltage Vp3 is set to a direct-current voltage at which the pump current Ip3 is a predetermined value (i.e., a fixed direct-current value). Therefore, by causing the pump current Ip3 to flow, the reference-gas adjustment pump cell 90 pumps in a specific amount of oxygen from the periphery of the outer pump electrode 23 to the periphery of the reference electrode 42.

The control device 95, including the variable power sources 24, 46, and 52 and the power supply circuit 92 shown in FIG. 2, is actually connected to the electrodes in the sensor element 101 via lead wires (not shown) provided in the sensor element 101 (only a reference electrode lead 47 to be described later is shown in FIG. 4), the connector 150, and the lead wires 155 shown in FIG. 1.

The reference-gas introduction section 49 and the surrounding configuration thereof will be described in detail with reference to FIG. 4. As mentioned above, FIG. 4 is a cross-sectional view taken along line A-A in FIG. 2. In FIG. 4, a region where the reference-gas introduction space 43 exists when the sensor element 101 is viewed from above, that is, a region where the reference-gas introduction space 43 is projected onto the cross section taken along line A-A in FIG. 2, is indicated with a single-dot chain line. The reference-gas introduction layer 48 extends inward (in this case, forward) in the longitudinal direction (in this case, the front-rear direction) of the sensor element 101 from near the rear end of the sensor element 101 to a position beyond the reference electrode 42. The reference-gas introduction layer 48 includes a front segment 48a and a rear segment 48b. The front segment 48a covers the reference electrode 42, and the pressure release hole 75 also extends vertically through this front segment 48a. In this embodiment, the reference-gas introduction layer 48 is a layer entirely composed of the same porous material and having a predetermined thickness (in this case, a predetermined length in the up-down direction), and has a rectangular cross section taken along a plane orthogonal to the longitudinal direction of the sensor element 101. Alternatively, the front segment 48a and the rear segment 48b may be composed of different materials, may have different thicknesses, and may have different cross-sectional shapes taken along the plane orthogonal to the longitudinal direction of the sensor element 101. The reference-gas introduction layer 48 may have a width (in this case, a length in the left-right direction) that increases in a stepwise manner from the rear side toward the front side of the sensor element 101. In detail, the front segment 48a and the rear segment 48b are both rectangular in plan view, that is, when viewed from above, and the width of the rectangle of the rear segment 48b is smaller than the width of the rectangle of the front segment 48a. As mentioned above, the upper surface of the reference-gas introduction layer 48 is partially exposed to the reference-gas introduction space 43. In detail, an overlapping section between the reference-gas introduction layer 48 and the reference-gas introduction space 43 (i.e., the rectangular region indicated with the single-dot chain line) shown in FIG. 4 is the part of the reference-gas introduction layer 48 that is exposed to the reference-gas introduction space 43. In this embodiment, a part of the upper surface of the front segment 48a and the entire upper surface of the rear segment 48b are exposed to the reference-gas introduction space 43. As shown in FIG. 4, the pressure release hole 75 is open to the reference-gas introduction space 43. As shown in FIGS. 2 and 4, the rear end of the reference-gas introduction layer 48 is located inward (in this case, forward) of the rear end surface of the sensor element 101. Therefore, the reference-gas introduction layer 48 is not directly exposed to the space 149 in FIG. 1, such that the reference gas in the space 149 travels sequentially through the reference-gas introduction space 43 and the reference-gas introduction layer 48 from the entrance 49a, so as to reach the reference electrode 42.

The reference electrode 42 is electrically connected to the reference electrode lead 47. The reference electrode lead 47 extends leftward from the right side surface of the sensor element 101 to extend into the porous reference-gas introduction layer 48, bends forward therefrom to extend in the longitudinal direction of the reference-gas introduction layer 48, and then reaches the reference electrode 42. In midcourse, the reference electrode lead 47 is wired to bypass the pressure release hole 75. This reference electrode lead 47 is connected to a connector electrode (not shown) disposed at the upper surface or the lower surface of the sensor element 101. By using the reference electrode lead 47 and the connector electrode, electricity can be supplied to the reference electrode 42 from the outside, or the voltage and the current of the reference electrode 42 can be externally measured. The reference-gas introduction layer 48 may also function as an insulation layer that insulates the reference electrode lead 47 from the third substrate layer 3 and the first solid electrolyte layer 4.

Next, an example of a method for manufacturing the gas sensor 100 will be described below. First, six non-calcinated ceramic green sheets each containing an oxygen-ion-conductive solid electrolyte, such as zirconia, as a ceramic component are prepared. In each of these green sheets, a plurality of sheet holes used for positioning during printing or stacking as well as necessary through-holes are formed in advance. Furthermore, the green sheet that is to become the spacer layer 5 preliminarily undergoes a punching process so as to be provided with a space that is to become the measurement-object gas flow section. The green sheet that is to become the first solid electrolyte layer 4 preliminarily undergoes a punching process so as to be provided with a space that is to become the reference-gas introduction space 43. Then, a pattern-printing process and a drying process for forming various patterns in the ceramic green sheets are performed in correspondence with the first substrate layer 1, the second substrate layer 2, the third substrate layer 3, the first solid electrolyte layer 4, the spacer layer 5, and the second solid electrolyte layer 6. In detail, the patterns to be formed are patterns of, for example, the aforementioned electrodes, the lead wires to be connected to the electrodes, the reference-gas introduction layer 48, and the heater unit 70. The pattern-printing process is performed by applying a pattern-forming paste prepared in accordance with the properties required in an object to be formed onto a green sheet by using a known screen printing technique. A known drying technique is also used for the drying process. When the pattern printing process and the drying process are completed, an adhesive paste for stacking and adhering together the green sheets corresponding to the respective layers is printed and dried. Then, the green sheets provided with the adhesive paste are stacked in a predetermined order while being positioned using the sheet holes, and then undergo a pressure bonding process by receiving a predetermined temperature and a predetermined pressure, thereby becoming a single layered body. The layered body obtained in this manner contains a plurality of sensor elements 101 therein. The layered body is cut so as to be divided into sensor elements 101 of a given size. Then, each divided piece of the layered body is calcinated at a predetermined calcination temperature so that a sensor element 101 is obtained. When the plurality of green sheets are to be stacked, the spaces that are to become the measurement-object gas flow section and the reference-gas introduction space 43 are preferably filled with a paste composed of a disappearing material (e.g., theobromine) that disappears during the calcination process.

When the sensor element 101 is obtained in this manner, the sensor assembly 140 (see FIG. 1) having the sensor element 101 integrated therein is fabricated, and the protection cover 130 and the rubber stopper 157 are attached thereto. Then, the control device 95 and the sensor element 101 are connected by the lead wires 155, so that the gas sensor 100 is obtained.

A process performed by the controller 96 when the gas sensor 100 detects the $NO_x$ concentration in the measurement-object gas will now be described. First, the CPU 97 of the controller 96 starts to drive the sensor element 101. In detail, the CPU 97 transmits a control signal to the heater power source 78 so as to heat the sensor element 101 by using the heater 72. Then, the CPU 97 heats the sensor element 101 to a predetermined driving temperature (e.g., 800° C.). Subsequently, the CPU 97 starts to control the aforementioned pump cells 21, 41, 50, and 90 and to acquire the voltages V0, V1, V2, and Vref from the aforementioned sensor cells 80 to 83. When the measurement-object gas is introduced through the gas inlet 10 in this state, the measurement-object gas travels through the first diffusion controlling section 11, the buffer space 12, and the second diffusion controlling section 13 so as to reach the first internal cavity 20. Then, the oxygen concentration of the measurement-object gas in the first internal cavity 20 and the second internal cavity 40 is adjusted by the main pump cell 21 and the auxiliary pump cell 50, and the measurement-object gas having undergone the adjustment reaches the third internal cavity 61. Subsequently, the CPU 97 detects the $NO_x$ concentration in the measurement-object gas based on the acquired pump current Ip2 and the correspondence relationship stored in the storage unit 98.

In the sensor element 101, the measurement-object gas flow section, such as the gas inlet 10, receives the measurement-object gas from the sensor element chamber 133 shown in FIG. 1. On the other hand, the reference-gas introduction section 49 in the sensor element 101 receives the reference gas (atmospheric gas) in the space 149 shown in FIG. 1. The sensor element chamber 133 and the space 149 are defined by the sensor assembly 140 (i.e., the green compacts 145a and 145b), and are sealed so that the gas does not flow therebetween. However, for example, in a case where the pressure of the measurement-object gas is high, the measurement-object gas slightly enters the space 149, sometimes causing the oxygen concentration in the space 149 to decrease. In this case, if the oxygen concentration around the reference electrode 42 also decreases, the reference potential serving as the potential of the reference electrode 42 changes. This may cause a change in, for example, a voltage based on the reference electrode 42, such as the voltage V2 of the measurement-pump-control oxygen-partial-pressure detection sensor cell 82 during the driving of the sensor element 101, thus resulting in reduced detection accuracy for the $NO_x$ concentration in the measurement-object gas. In contrast, in the sensor element 101 according to this embodiment, the reference-gas introduction section 49 is designed such that a limiting current A when oxygen is pumped out from the periphery of the reference electrode 42 to the periphery of a measurement-object-gas side electrode (in this case, the outer pump electrode 23) is 30 μA or lower. This limiting current A has a positive correlation with the reciprocal of the diffusion resistance of the reference-gas introduction section 49, such that the diffusion resistance of the reference-gas introduction section 49 increases with decreasing limiting current A. With the limiting current A being 30 μA or lower, the diffusion resistance of the reference-gas introduction section 49 is sufficiently high, so that a decrease in the oxygen concentration around the reference electrode 42 can be suppressed even when the oxygen concentration of the reference gas surrounding the sensor element 101 (in this case, the oxygen concentration in the space 149) decreases. Specifically, the resistance to a decrease in the oxygen concentration of the reference gas outside the sensor element 101 is enhanced. Accordingly, a change in the reference potential is suppressed, so that reduced detection accuracy for the $NO_x$ concentration in the measurement-object gas is also suppressed. Although the measurement-object gas may sometimes contain a contaminant (i.e., a toxic substance), the contaminant can be prevented from reaching the reference electrode 42 owing to the limiting current A being 30 μA or lower.

A method of measuring the limiting current A of the reference-gas introduction section 49 is as follows. First, the sensor element 101 is set in the atmospheric gas, electricity is applied to the heater 72, and the sensor element 101 is heated to a predetermined driving temperature (e.g., 800° C.). The variable power sources 24, 46, and 52 and the power supply circuit 92 are all set in a state where they do not receive voltage. After the temperature of the sensor element 101 becomes stable, the power supply circuit 92 applies the control voltage Vp3 between the outer pump electrode 23 and the reference electrode 42 so that oxygen is pumped out from the periphery of the reference electrode 42 to the periphery of the outer pump electrode 23. At this time, the pump current Ip3 flowing between the electrodes 23 and 42 is measured. The control voltage Vp3 is a direct-current voltage. Subsequently, as the control voltage Vp3 is gradually increased, the pump current Ip3 also gradually increases. Ultimately, the pump current Ip3 reaches its upper limit and does not increase any further even if the control voltage Vp3 is increased. The upper limit in this case is referred to as the limiting current A. The flow rate of the atmospheric gas introduced through the entrance 49a of the reference-gas introduction section 49 and reaching the reference electrode 42 is dependent on the diffusion resistance of the reference-gas introduction section 49. Therefore, the limiting current A has a positive correlation with the reciprocal of the diffusion resistance of the reference-gas introduction section 49, and decreases with increasing diffusion resistance of the reference-gas introduction section 49. It is conceivable that the limiting current A is substantially proportional to 1/(Ra+Rp), where Ra denotes the diffusion resistance of the reference-gas introduction space 43 and Rp denotes the diffusion resistance of the reference-gas introduction layer 48. Therefore, the limiting current A can be adjusted by adjusting at least one of the diffusion resistance Ra and the diffusion resistance Rp. The diffusion resistance Ra of the reference-gas introduction space 43 can be adjusted by, for example, changing the shape of the reference-gas introduction space 43. If the shape of the reference-gas introduction space 43 is to be changed, for example, at least one of the thickness (in this case, the dimension in the up-down direction), the width (in this case, the dimension in the left-right direction), and the length (in this case, the dimension in the front-rear direction) of the reference-gas introduction space 43 may be changed. The diffusion resistance Rp of the reference-gas introduction layer 48 can be adjusted by, for example, changing a porosity P of the reference-gas introduction layer 48 or by changing the shape of the reference-gas introduction layer 48. If the shape of the reference-gas introduction layer 48 is to be changed, for example, at least one of the thickness (in this case, the dimension in the up-down direction), the width (in this case, the dimension in the left-right direction), and the length (in this case, the dimension in the front-rear direction) of the reference-gas introduction layer 48 may be changed. Alternatively, the shape of one of the front segment 48a and the rear segment 48b may be changed. The limiting current A can be changed also by changing an exposed area S, to be described later, of the reference-gas introduction layer 48.

During a non-driving period of the sensor element 101, the reference-gas introduction layer 48 may sometimes adsorb water from outside the sensor element 101, that is, from inside the space 149. The water in the space 149 may originally exist slightly in the space 149 or may enter the space 149 from a gap between the rubber stopper 157 and the outer cylinder 148. When the controller 96 starts driving the sensor element 101, the sensor element 101 is heated by the heater 72 so that water in the reference-gas introduction layer 48 becomes gas and is released outward (in this case, the space 149) from the reference-gas introduction layer 48. However, until the water is released, the water in the gaseous state exists, sometimes causing the oxygen concentration around the reference electrode 42 to decrease. Thus, especially in the case of a sensor element not having the reference-gas introduction space 43 such that the reference-gas introduction layer 48 is exposed at the rear end surface of the sensor element 101 (e.g., a sensor element 901 according to Comparative Example 1 shown in FIGS. 7 and 8 to be described later), it takes time for the water to be released from the reference-gas introduction layer 48, sometimes resulting in an extended time period (referred to as "stabilization period" hereinafter) from when the driving of the sensor element is started to when the potential of the reference electrode 42 becomes stable. In contrast, in the sensor element 101 according to this embodiment, A×Ra as a product of the diffusion resistance Ra of the reference-gas introduction space 43 and the limiting current A is 50,000 or smaller. As mentioned above, since the limiting current A has a positive correlation with the reciprocal of the diffusion resistance of the reference-gas introduction section 49, A×Ra has a positive correlation with the percentage of the diffusion resistance Ra of the reference-gas introduction space 43 occupying the diffusion resistance of the reference-gas introduction section 49. For example, it is conceivable that A×Ra is substantially proportional to Ra/(Ra+Rp). With A×Ra being 50,000 or smaller, the percentage of the diffusion resistance Ra of the reference-gas introduction space 43 occupying the diffusion resistance of the reference-gas introduction section 49 is sufficiently low, so that the water adsorbed into the reference-gas introduction layer 48 when the sensor element 101 is not driven passes through the reference-gas introduction space 43 and is readily diffused outward (in this case, the space 149) from the sensor element 101 during the driving of the sensor element 101. Therefore, the stabilization period of the sensor element 101 can be shortened.

The diffusion resistance Ra of the reference-gas introduction space 43 can be determined by dividing the length of the reference-gas introduction space 43 in the front-rear direction by an average cross-sectional area. In this case, a value obtained by dividing a volume Ca of the reference-gas introduction space 43 by the length in the front-rear direction is used as the average cross-sectional area. Because the reference-gas introduction space 43 in this embodiment has a rectangular prismatic shape and does not vary in cross-sectional area in the front-rear direction, the diffusion resistance Ra can also be determined by dividing the length in the front-rear direction by the cross-sectional area (=thickness multiplied by width).

Accordingly, in the sensor element 101 according to this embodiment, the limiting current A is 30 µA or lower and A×Ra is 50,000 or smaller, so that the resistance to a decrease in the oxygen concentration of the reference gas outside the sensor element 101 is enhanced, and the stabilization period for the potential of the reference electrode 42 during the driving of the sensor element 101 is shortened. Although the limiting current A can be reduced by increasing at least one of the diffusion resistance Ra of the reference-gas introduction space 43 and the diffusion resistance Rp of the reference-gas introduction layer 48, A×Ra exceeds 50,000 if the diffusion resistance Ra is excessively increased. By appropriately adjusting the diffusion resistance Ra and the diffusion resistance Rp such that the limiting current A is 30 µA or lower and A×Ra is 50,000 or smaller, the two aforementioned advantages can both be achieved. Since it is difficult to directly measure the diffusion resistance Rp of the reference-gas introduction layer 48 alone in the case where the reference-gas introduction section 49 has the reference-gas introduction space 43 and the reference-gas introduction layer 48, the present inventors have found numerical ranges for the limiting current A and A×Ra for achieving both of the two aforementioned advantages by using the limiting current A having a correlation with the diffusion resistance of the entire reference-gas introduction section 49 and also using the diffusion resistance Ra of the reference-gas introduction space 43.

The limiting current A is preferably 20 µA or lower, and is more preferably 15 µA or lower. The resistance to a decrease in the oxygen concentration of the reference gas outside the sensor element 101 can be further enhanced with decreasing limiting current A. The limiting current A may be 1 µA or higher, or may be 5 µA or higher.

A×Ra is preferably 41,000 or smaller, is more preferably 20,000 or smaller, and is even more preferably 10,000 or smaller. The stabilization period can be shortened with decreasing A×Ra. A×Ra may be 2500 or larger, may be 3900 or larger, or may be 7000 or larger. The diffusion resistance Ra of the reference-gas introduction space 43 is preferably 2000 [/mm] or lower, is more preferably 1500 [/mm] or lower, is even more preferably 1000 [/mm] or lower, and is yet even more preferably 550 [/mm] or lower. The value of A×Ra can be reduced more readily with decreasing diffusion resistance Ra.

The area of the part of the reference-gas introduction layer 48 that is exposed to the reference-gas introduction space 43 will be referred to as "exposed area S". This exposed area S is preferably 10 mm$^2$ or larger. As mentioned above, in this embodiment, the upper surface of the reference-gas introduction layer 48 is partially exposed to the reference-gas introduction space 43, and the area of the overlapping section between the reference-gas introduction layer 48 and the reference-gas introduction space 43 (i.e., the rectangular region indicated with the single-dot chain line) shown in FIG. 4 corresponds to the exposed area S. Although the rear end surface of the reference-gas introduction layer 48 is also exposed to the reference-gas introduction space 43, as shown in FIG. 2, since the thickness of the reference-gas introduction layer 48 is extremely small as compared with the length and the width of the exposed part of the upper surface of the reference-gas introduction layer 48, the area of the rear end surface is extremely small. Therefore, the area of the rear end surface of the reference-gas introduction layer 48 is not included in the exposed area S (i.e., the area of the rear end surface is negligible). When the exposed area S is 10 mm² or larger, the water in the reference-gas introduction layer 48 is likely to be diffused to the reference-gas introduction space 43, so that the stabilization period can be readily shortened. The exposed area S is more preferably 15 mm² or larger, even more preferably 20 mm² or larger, and yet even more preferably 25 mm² or larger. The exposed area S may be 40 mm² or smaller, or may be 30 mm² or smaller.

A volume ratio Cp/Ca of a volume Cp of the reference-gas introduction layer 48 to the volume Ca of the reference-gas introduction space 43 is preferably 0.87 or lower. The volume Cp is a value determined from the outer dimensions of the reference-gas introduction layer 48. Specifically, the volume of pores in the reference-gas introduction layer 48 is also included in the volume Cp. When the volume ratio Cp/Ca is 0.87 or lower, the volume Ca of the reference-gas introduction space 43 is relatively large, so that the diffusion resistance Ra of the reference-gas introduction space 43 can be reduced, thereby readily setting A×Ra to 50,000 or smaller. The volume ratio Cp/Ca may be 0.50 or lower, may be 0.40 or lower, or may be 0.30 or lower. The volume ratio Cp/Ca may be 0.15 or higher. For example, the volume Ca of the reference-gas introduction space 43 is preferably 1.5 mm³ or larger, is more preferably 2.0 mm³ or larger, is even more preferably 3.5 mm³ or larger, and yet even more preferably 5.0 mm³ or larger. The volume Ca may be 6.0 mm³ or smaller. The volume Cp of the reference-gas introduction layer 48 may be, for example, 0.5 mm³ or larger and 1.5 mm³ or smaller.

The porosity P of the reference-gas introduction layer 48 is preferably between 1% and 30% inclusive. With the porosity P being 1% or higher, the reference gas can reach the reference electrode 42. With the porosity P being 30% or lower, the amount of water adsorbed in the reference-gas introduction layer 48 can be reduced, so that the stabilization period can be readily shortened. The porosity P is more preferably 20% or lower.

The porosity P of the reference-gas introduction layer 48 is a value derived as follows by using an image (SEM image) obtained from observation using a scanning electron microscope (SEM). First, the sensor element 101 is cut such that a cross section of the reference-gas introduction layer 48 is set as an observation surface, and an observation sample is obtained by performing a resin-embedding process and a polishing process on the cut surface. Then, the observation surface of the observation sample is photographed by SEM photography (with a secondary electron image, an acceleration voltage of 15 kV, and a magnifying power of 1000, but a magnifying power higher than 1000 and 5000 or lower if the magnifying power of 1000 is inappropriate), whereby an SEM image of the reference-gas introduction layer 48 is obtained. Subsequently, the obtained image is analyzed, so that a threshold value is determined using the discriminant analysis method (Otsu binarization method) from a brightness distribution of brightness data of the pixels in the image. Then, each pixel in the image is binarized into an object section and a pore section based on the determined threshold value, and the area of the object section and the area of the pore section are calculated. Then, the percentage of the area of the pore section relative to the overall area (i.e., the total area of the object section and the pore section) is derived as the porosity P [%]. For example, the porosity P can be adjusted by adjusting the particle diameter of the ceramic particles contained in the pattern-forming paste of the reference-gas introduction layer 48 or by adjusting the particle diameter or the mixture ratio of a pore-forming material.

In this embodiment, during the driving of the sensor element 101, the controller 96 uses the reference-gas adjustment pump cell 90 to pump in oxygen from the periphery of the outer pump electrode 23 to the periphery of the reference electrode 42, as mentioned above. Accordingly, when the oxygen concentration around the reference electrode 42 decreases, the reduced oxygen can be compensated for, thereby suppressing a decrease in the detection accuracy for the NOx concentration. However, depending on the degree of a decrease in the oxygen concentration of the reference gas surrounding the sensor element 101, the oxygen concentration around the reference electrode 42 may sometimes decrease even if oxygen is pumped in toward the periphery of the reference electrode 42 by the reference-gas adjustment pump cell 90. Therefore, the reference-gas introduction section 49 is preferably designed such that the limiting current A is 30 µA or lower, regardless of whether or not oxygen pumping is performed by the reference-gas adjustment pump cell 90.

The correspondence relationship between the components in this embodiment and the components in the present invention will now be clarified. The first substrate layer 1, the second substrate layer 2, the third substrate layer 3, the first solid electrolyte layer 4, the spacer layer 5, and the second solid electrolyte layer 6 according to this embodiment correspond to an element body according to the present invention, the measurement electrode 44 corresponds to a measurement electrode, the outer pump electrode 23 corresponds to a measurement-object-gas side electrode, the reference electrode 42 corresponds to a reference electrode, the reference-gas introduction space 43 corresponds to a reference-gas introduction space, the reference-gas introduction layer 48 corresponds to a reference-gas introduction layer, the reference-gas introduction section 49 corresponds to a reference-gas introduction section, and the heater 72 corresponds to a heater.

In the gas sensor 100 according to this embodiment described above in detail, the limiting current A is 30 µA or lower and A×Ra is 50,000 or smaller, so that the resistance to a decrease in the oxygen concentration of the reference gas outside the sensor element 101 is enhanced, and the stabilization period for the potential of the reference electrode 42 during the driving of the sensor element 101 is shortened. Furthermore, with the exposed area S being 10 mm² or larger, the water in the reference-gas introduction layer 48 is likely to be diffused to the reference-gas introduction space 43, so that the stabilization period can be readily shortened. Moreover, with the volume ratio Cp/Ca being 0.87 or lower, the volume Ca of the reference-gas introduction space 43 is relatively large, so that the diffusion resistance Ra can be reduced, thereby readily setting A×Ra to 50,000 or smaller. Furthermore, with the limiting current A being 20 µA or lower, the resistance to a decrease in the oxygen concentration of the reference gas outside the sensor element 101 can be further enhanced. With the porosity P being 1% or higher, the reference gas can reach the reference electrode 42. With the porosity P being 30% or lower, the amount of water adsorbed in the reference-gas introduction layer 48 can be reduced, so that the stabilization period can be readily shortened. With A×Ra being 41,000 or smaller, the stabilization period can be further shortened.

The present invention is not limited whatsoever to the above embodiment, and various embodiments are possible so long as they belong within the technical scope of the present invention.

For example, although the reference electrode lead 47 is bifurcated into two branches in mid-course for bypassing the pressure release hole 75 in the above embodiment, the bypassing and the bifurcation are not necessary if there is no pressure release hole 75.

In the above embodiment, the rear end of the reference-gas introduction layer 48 is located inward relative to the rear end surface of the sensor element 101, but the configuration is not limited thereto. For example, the reference-gas introduction layer 48 may be longer than that in FIG. 4, such that the rear end of the reference-gas introduction layer 48 is flush with the rear end surface of the sensor element 101 (i.e., the rear end of the reference-gas introduction layer 48 is directly exposed to the space 149). In other words, a path for the reference gas may exist such that the reference gas outside the sensor element 101 reaches the reference-gas introduction layer 48 without traveling through the reference-gas introduction space 43.

Figure 5:
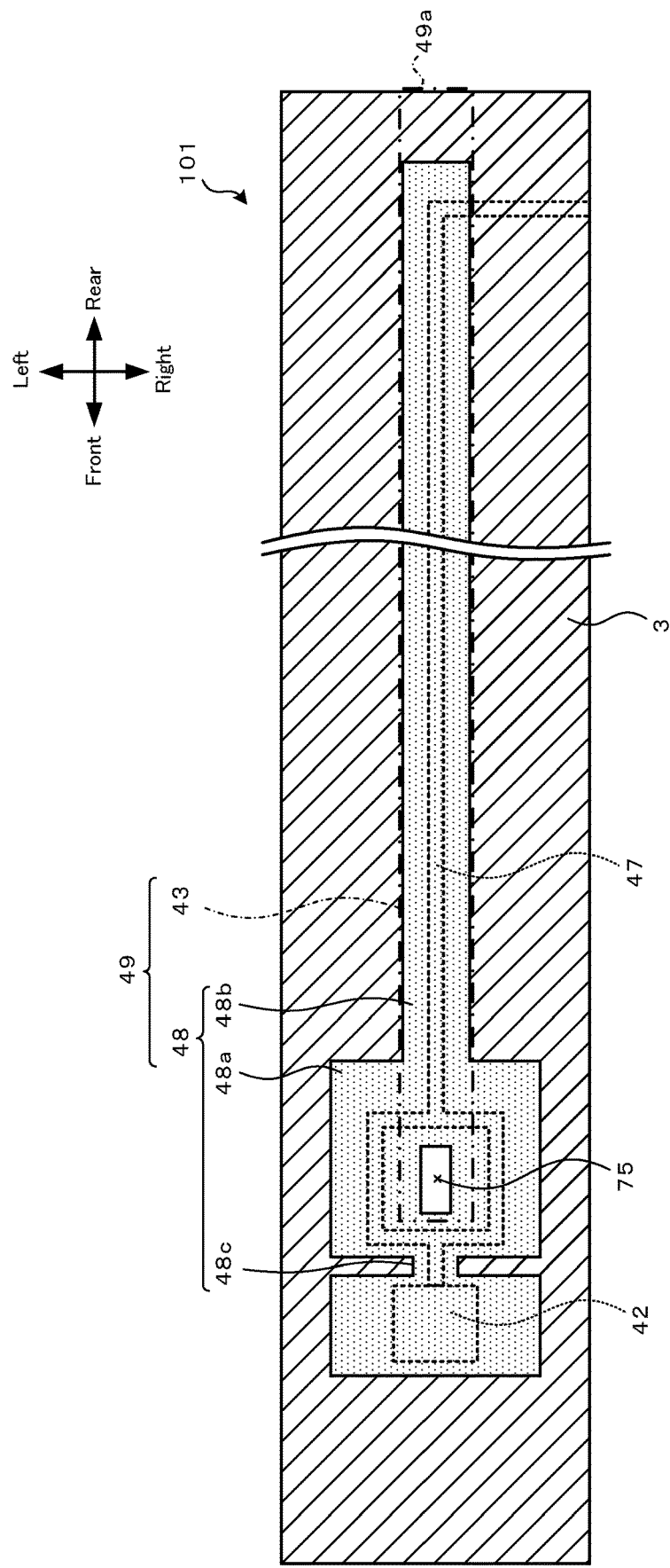
FIG. 5 is a cross-sectional view illustrating an example of a reference-gas introduction layer 48 having a constricted segment 48c.

In the above embodiment, the front segment 48a and the rear segment 48b of the reference-gas introduction layer 48 are both rectangular in plan view, but the shape is not particularly limited thereto. For example, at least one of the front segment 48a and the rear segment 48b may have a shape with a width that gradually increases in the front-rear direction. Furthermore, the reference-gas introduction layer 48 may have the shape shown in FIG. 5. In the reference-gas introduction layer 48 in FIG. 5, the front segment 48a is further divided into a front side and a rear side, and a constricted segment 48c having a width smaller than that of the front segment 48a is provided between the front side and the rear side. With the existence of the constricted segment 48c, the diffusion resistance Rp of the reference-gas introduction layer 48 can be increased, so that the limiting current A can be reduced without increasing the diffusion resistance Ra of the reference-gas introduction space 43.

Figure 6:
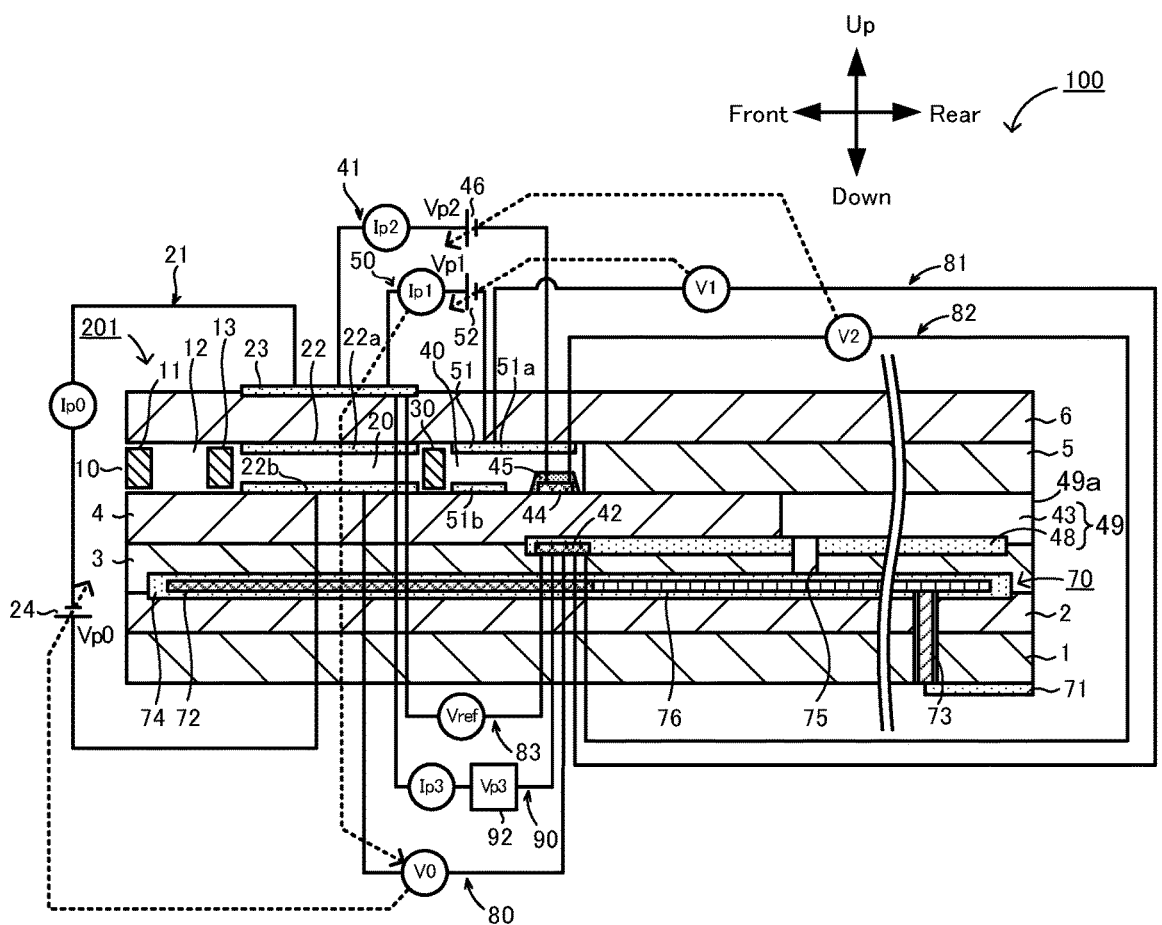
FIG. 6 is a schematic cross-sectional view of a sensor element 201 according to a modification.

In the above embodiment, the sensor element 101 of the gas sensor 100 has the first internal cavity 20, the second internal cavity 40, and the third internal cavity 61, but the configuration is not limited thereto. For example, the third internal cavity 61 does not have to be provided, as in a sensor element 201 according to a modification shown in FIG. 6. In the sensor element 201 according to the modification shown in FIG. 6, the gas inlet 10, the first diffusion controlling section 11, the buffer space 12, the second diffusion controlling section 13, the first internal cavity 20, the third diffusion controlling section 30, and the second internal cavity 40 are provided next to one another between the lower surface of the second solid electrolyte layer 6 and the upper surface of the first solid electrolyte layer 4 in a conductive manner in that order. Furthermore, the measurement electrode 44 is disposed on the upper surface of the first solid electrolyte layer 4 within the second internal cavity 40. The measurement electrode 44 is covered by a fourth diffusion controlling section 45. The fourth diffusion controlling section 45 is a film formed of a ceramic porous body composed of, for example, alumina ($Al_2O_3$). Similar to the fourth diffusion controlling section 60 according to the above embodiment, the fourth diffusion controlling section 45 has a role of limiting the amount of $NO_x$ flowing to the measurement electrode 44. Moreover, the fourth diffusion controlling section 45 also functions as a protective film for the measurement electrode 44. The ceiling electrode 51a of the auxiliary pump electrode 51 is provided to extend to a position directly above the measurement electrode 44. The sensor element 201 having such a configuration is similar to that in the above embodiment in that the measurement pump cell 41 can detect the $NO_x$ concentration. In the sensor element 201 in FIG. 6, the periphery of the measurement electrode 44 functions as a measurement chamber. Specifically, the periphery of the measurement electrode 44 has a role similar to that of the third internal cavity 61.

In the above embodiment, the pump current Ip3 is a fixed direct current, but is not limited thereto. For example, the pump current Ip3 may be a pulsed intermittent current. Furthermore, the pump current Ip3 is a fixed direct current that constantly flows in the direction in which oxygen is pumped in toward the periphery of the reference electrode 42 in the above embodiment, but is not limited thereto. For example, there may be a time period in which the pump current Ip3 flows in the direction in which oxygen is pumped out from the periphery of the reference electrode 42. Even in that case, the overall moving direction of the oxygen may be the direction in which the oxygen is pumped in toward the periphery of the reference electrode 42 in view of a sufficiently-long predetermined time period.

In the aforementioned sensor element 101, the circuit of the reference-gas adjustment pump cell 90 may be omitted, or the gas sensor 100 does not have to be equipped with the power supply circuit 92. Furthermore, the gas sensor 100 does not have to be equipped with the control device 95. For example, in place of the control device 95, the gas sensor 100 may include an external connector attached to the lead wires 155 and used for connecting the control device 95 and the lead wires 155.

In the above embodiment, the reference electrode 42 is provided directly on the upper surface of the third substrate layer 3, but the configuration is not limited thereto. For example, the reference electrode 42 may be provided directly on the lower surface of the first solid electrolyte layer 4. Moreover, although the upper surface of the reference-gas introduction layer 48 is exposed to the reference-gas introduction space 43, the lower surface of the reference-gas introduction layer 48 may be exposed to the reference-gas introduction space 43.

In the above embodiment, the reference gas is atmospheric gas, but is not limited thereto so long as the gas serves as a reference for detecting the concentration of a specific gas in the measurement-object gas. For example, the space 149 may be filled with a gas that has been adjusted to a predetermined oxygen concentration (>the oxygen concentration of the measurement-object gas) as the reference gas.

In the above embodiment, the front surface (i.e., the part exposed to the sensor element chamber 133) of the sensor element 101 including the outer pump electrode 23 may be covered with a porous protective layer composed of a ceramic material, such as alumina.

In the above embodiment, the CPU 97 performs feedback control on the voltage Vp2 of the variable power source 46 so as to set the voltage V2 to the target value V2*, and detects the $NO_x$ concentration in the measurement-object gas based on the detection value (i.e., the pump current Ip2), but the configuration is not limited thereto. For example, the CPU 97 may control the measurement pump cell 41 (e.g., control the voltage Vp2) so as to set the pump current Ip2 to a fixed target value Ip2*, and detect the $NO_x$ concentration by using the detection value (i.e., the voltage V2). By controlling the measurement pump cell 41 so that the pump current Ip2 becomes the target value Ip2*, oxygen is pumped out from the third internal cavity 61 at a substantially fixed flow rate. Therefore, the oxygen concentration in the third internal cavity 61 changes in accordance with the amount of oxygen produced as a result of the $NO_x$ in the measurement-object gas being reduced in the third internal cavity 61, whereby the voltage V2 changes. Accordingly, the voltage V2 becomes a value according to the $NO_x$ concentration in the measurement-object gas. Therefore, the controller 96 can calculate the $NO_x$ concentration based on the voltage V2. In this case, for example, the correspondence relationship between the voltage V2 and the $NO_x$ concentration may be stored in advance in the storage unit 98.

In the above embodiment, the $NO_x$ concentration in the measurement-object gas is detected by the sensor element 101, but is not limited thereto so long as the concentration of a specific gas in the measurement-object gas is detected. For example, instead of $NO_x$, the concentration of another oxide may be detected as the specific gas concentration. If the specific gas is an oxide, oxygen is produced when the specific gas itself is reduced in the third internal cavity 61 similarly to the above embodiment, so that the measurement pump cell 41 can acquire a detection value (e.g., the pump current Ip2) according to this oxygen and detect the specific gas concentration. Furthermore, the specific gas may be a non-oxide, such as ammonia. If the specific gas is a non-oxide, the specific gas is converted into an oxide (e.g., is converted into NO in the case of ammonia), so that oxygen is produced when the converted gas is reduced in the third internal cavity 61. Thus, the measurement pump cell 41 can acquire a detection value (e.g., the pump current Ip2) according to this oxygen and detect the specific gas concentration. For example, the inner pump electrode 22 in the first internal cavity 20 functions as a catalyst, so that the ammonia can be converted into NO in the first internal cavity 20.

In the above embodiment, the element body of the sensor element 101 is a layered body having a plurality of solid electrolyte layers (i.e., layers 1 to 6), but is not limited thereto. The element body of the sensor element 101 may include at least one oxygen-ion-conductive solid electrolyte layer. For example, the layers 1 to 5 other than the second solid electrolyte layer 6 in FIG. 2 may be structural layers (e.g., layers composed of alumina) composed of a material other than that of solid electrolyte layers. In this case, the electrodes in the sensor element 101 may be disposed on the second solid electrolyte layer 6. For example, the measurement electrode 44 in FIG. 2 may be disposed on the lower surface of the second solid electrolyte layer 6. Moreover, the reference-gas introduction space 43 may be provided in the spacer layer 5 instead of the first solid electrolyte layer 4, and the reference-gas introduction layer 48 may be provided between the second solid electrolyte layer 6 and the spacer layer 5 instead of being provided between the first solid electrolyte layer 4 and the third substrate layer 3, and the reference electrode 42 may be provided rearward of the third internal cavity 61 and on the lower surface of the second solid electrolyte layer 6.

In the above embodiment, the outer pump electrode 23 serves as an outer main pump electrode disposed in a part of the main pump cell 21 to be exposed to the measurement-object gas at the outer side of the sensor element 101, an outer auxiliary pump electrode disposed in a part of the auxiliary pump cell 50 to be exposed to the measurement-object gas at the outer side of the sensor element 101, an outer measurement electrode disposed in a part of the measurement pump cell 41 to be exposed to the measurement-object gas at the outer side of the sensor element 101, and a measurement-object-gas side electrode disposed in a part of the reference-gas adjustment pump cell 90 to be exposed to the measurement-object gas at the outer side of the sensor element 101, but is not limited to thereto. At least one of the outer main pump electrode, the outer auxiliary pump electrode, the outer measurement electrode, and the measurement-object-gas side electrode may be provided at the outer side of the sensor element 101 in addition to the outer pump electrode 23.

In the above embodiment, the controller 96 sets (i.e., performs feedback control on) the target value V0* of the voltage V0 based on the pump current Ip1 so as to set the pump current Ip1 to the target value Ip1*, and performs feedback control on the pump voltage Vp0 so as to set the voltage V0 to the target value V0*, but may perform another type of control. For example, the controller 96 may perform feedback control on the pump voltage Vp0 based on the pump current Ip1 so as to set the pump current Ip1 to the target value Ip1*. Specifically, the controller 96 may omit the acquisition of the voltage V0 from the main-pump-control oxygen-partial-pressure detection sensor cell 80 and the setting of the target value V0*, and may directly control the pump voltage Vp0 (and by extension the pump current Ip0) based on the pump current Ip1.

EXAMPLES

Specific fabrication examples of gas sensors will be described below as examples. The present invention is not limited to the following examples.

Example 1

Example 1 is achieved by fabricating the gas sensor 100 shown in FIGS. 1 to 4 in accordance with the above-described manufacturing method. For fabricating the sensor element 101, each green sheet is obtained by mixing zirconia particles having 4 mol % of yttria added thereto as a stabilizer with an organic binder and an organic solvent, and then molding the mixture by tape molding. The green compacts 145a and 145b in FIG. 1 are obtained by molding talc powder. The reference-gas introduction layer 48 used is a ceramic layer composed of alumina. The reference-gas introduction space 43 is formed by using theobromine as a disappearing material. With regard to the dimensions of the front segment 48a of the reference-gas introduction layer 48, the thickness is 0.03 mm, the width is 2.26 mm, and the length is 7.17 mm. With regard to the dimensions of the rear segment 48b, the thickness is 0.03 mm, the width is 0.5 mm, and the length is 52.6 mm. Therefore, the volume Cp of the reference-gas introduction layer 48 is 1.3 $mm^3$. The porosity P of the reference-gas introduction layer 48 is 10.0%. With regard to the dimensions of the reference-gas introduction space 43, the thickness is 0.2 mm, the width is 0.5 mm, and the length is 53.80 mm. Therefore, the diffusion resistance Ra of the reference-gas introduction space 43 is 538 [/mm]. Furthermore, the volume Ca of the reference-gas introduction space 43 is 5.4 $mm^3$. The volume ratio Cp/Ca is 0.24. The exposed area S is 26 $mm^2$. The limiting current A is 15 µA. A×Ra is 8070.

Examples 2 to 9, Comparative Examples 1 to 3

Figure 7:
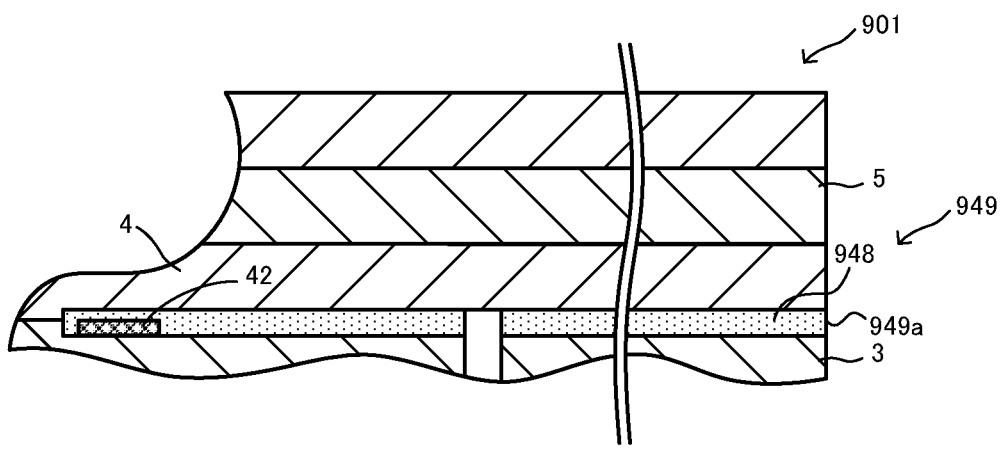
FIG. 7 is a partial cross-sectional view illustrating a reference-gas introduction section 949 according to Comparative Example 1 and the periphery thereof.
Figure 8:
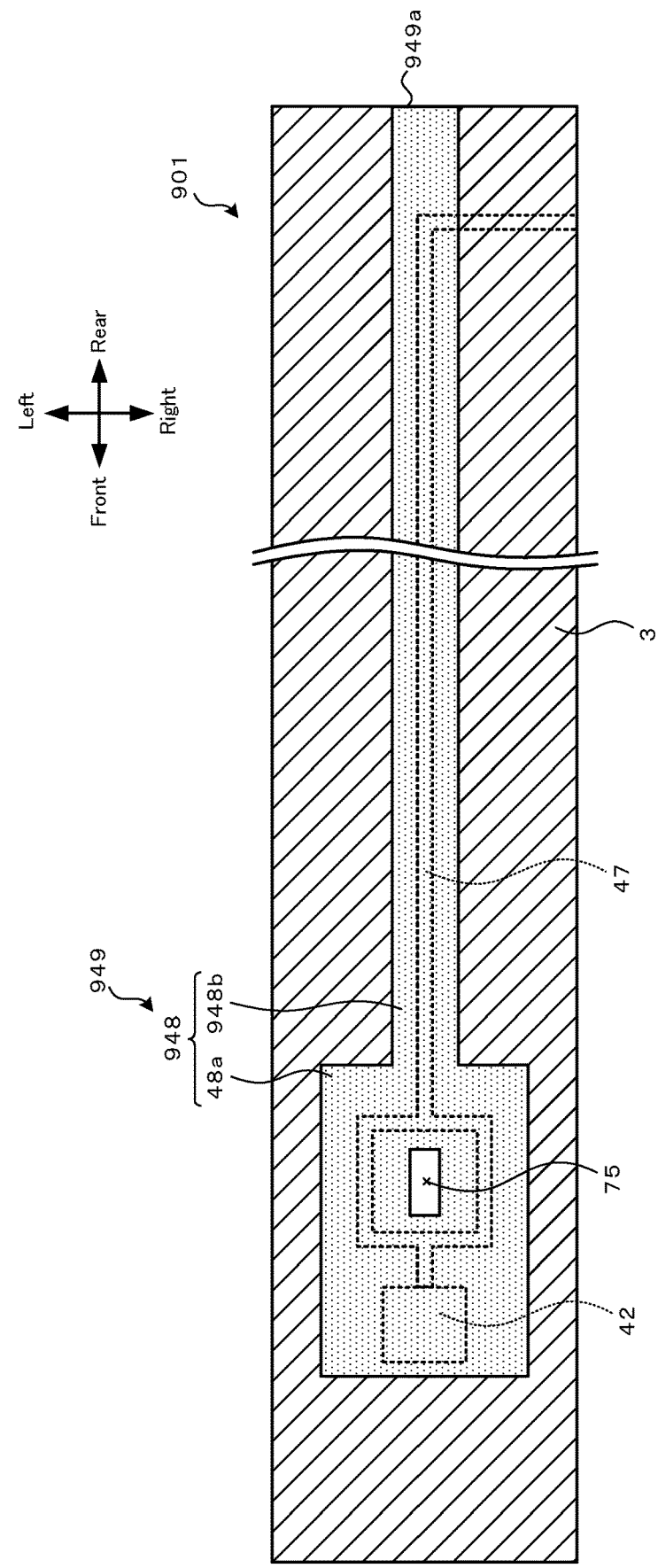
FIG. 8 is a cross-sectional view illustrating the reference-gas introduction section 949 according to Comparative Example 1.

Gas sensors 100 according to Examples 2 to 9 and Comparative Examples 1 to 3 are fabricated by changing at least one of the dimensions of the reference-gas introduction layer 48, the dimensions of the reference-gas introduction space 43, the porosity P, and the exposed area S from Example 1 such that values indicated in Table 1 are obtained. In each of Examples 4 and 9, the length of the sensor element 101 is reduced, so that the length of the rear segment 48b and the length of the reference-gas introduction space 43 are reduced. In Example 8, the reference-gas introduction layer 48 has the constricted segment 48c shown in FIG. 5. In Table 1, the length (6.7 mm) of the front segment 48a in Example 8 corresponds to the length excluding the constricted segment 48c from the front segment 48a in FIG. 5. Moreover, in Table 1, the thickness, the width, and the length of the constricted segment 48c in Example 8 are also indicated. The sensor element 901 in the gas sensor 100 according to Comparative Example 1 does not have the reference-gas introduction space 43, as shown in FIGS. 7 and 8. In detail, a reference-gas introduction section 949 of the sensor element 901 does not have the reference-gas introduction space 43, but includes a reference-gas introduction layer 948. The reference-gas introduction layer 948 includes the front segment 48a having the same dimensions as in Example 1, and also includes a rear segment 948b. The rear segment 948b is different from the rear segment 48b in FIG. 4 in that the rear end extends until it is flush with the rear end surface of the sensor element 901, and is longer than the rear segment 48b in Example 1 by that amount. The rear end surface of the rear segment 948b serves as an entrance 949a of the reference-gas introduction section 49.

[Evaluation Test 1]

With regard to each of the gas sensors 100 according to Examples 1 to 9 and Comparative Examples 1 to 3, the stability of NO$_x$ output (i.e., the value of the pump current Ip2) during the driving of the sensor element is examined to evaluate the aforementioned stabilization period. First, the gas sensor 100 according to Example 1 is stored in a thermos-hygrostat for one week at a temperature of 40° C. and a humidity of 85%, thereby causing water adsorption in the reference-gas introduction space 43. Then, the gas sensor 100 according to Example 1 is attached to a pipe. A model gas having nitrogen as a base gas and with an oxygen concentration of 0% and NO$_x$ concentration of 1500 ppm is prepared, and is caused to flow through the pipe as a measurement-object gas. In this state, the sensor element 101 is driven by the control device 95. In detail, the control device 95 applies electricity to the heater 72 to heat the sensor element 101, and maintains the temperature of the sensor element 101 at 800° C. Furthermore, the control device 95 is continuously controlling the aforementioned pump cells 21, 41, and 50 and acquiring the voltages V0, V1, V2, and Vref from the aforementioned sensor cells 80 to 83. The reference-gas adjustment pump cell 90 is not actuated. The aforementioned state from when the driving (i.e., the heating) of the sensor element 101 is started is maintained for 30 minutes. During that time, the pump current Ip2 is continuously measured, and the time period from when the driving is started to when the pump current Ip2 to becomes stable is measured. Until the water in the reference-gas introduction layer 48 is released from when the driving of the sensor element 101 is started, the water in the gaseous state exists, thus causing the oxygen concentration around the reference electrode to decrease. Therefore, the potential of the reference electrode 42 is not stable. This means that, until the potential of the reference electrode 42 becomes stable, the pump current Ip2 is not stable even if the NO$_x$ concentration of the measurement-object gas is constant. Accordingly, based on the length of the time it takes for the pump current Ip2 to become stable, it is possible to determine the length of the stabilization period serving as a time period from when the driving of the sensor element 101 is started to when the potential of the reference electrode 42 becomes stable. When the pump current Ip2 becomes stable within 10 minutes from when the driving is started, it is determined that the stabilization period is extremely short ("A"). When the pump current Ip2 becomes stable after 10 minutes but within 30 minutes from when the driving is started, it is determined that the stabilization period is short ("B"). If the pump current Ip2 does not become stable within 30 minutes from when the driving is started, it is determined that the stabilization period is long ("F"). Tests are performed similarly on the gas sensors 100 according to Examples 2 to 9 and Comparative Examples 1 to 3.

[Evaluation Test 2]

With regard to each of the gas sensors 100 according to Examples 1 to 9 and Comparative Examples 1 to 3, the resistance to a decrease in the oxygen concentration of the reference gas outside the sensor element 101 is evaluated. First, the gas sensor 100 according to Example 1 is attached to a pipe of an exhaust gas pipe of an automobile. Then, the gasoline engine of the automobile is kept running for 20 minutes under predetermined operating conditions (with an engine rotation speed of 4000 rpm, an exhaust-gas gauge pressure of 20 kPa, an air-fuel (A/F) ratio value of 11.0, a load torque of 130 N·m, and an excess air factor (=air-fuel ratio/theoretical air-fuel ratio) of 0.83). In this state, the sensor element 101 is driven by the control device 95, similarly to Evaluation Test 1, all pump cells excluding the reference-gas adjustment pump cell 90 are actuated, and the NO$_x$ concentration is measured. Then, during the 20-minute period, it is examined whether or not a change in the voltage Vref has exceeded a predetermined amount of change (50 mV) from a value (i.e., a theoretical value of the voltage Vref) corresponding to an oxygen concentration difference between the exhaust gas with λ=0.83 and the reference gas (i.e., atmospheric gas). When the voltage Vref of the sensor element 101 is less likely to change, the oxygen concentration around the reference electrode 42 is less likely to decrease even when the exhaust gas enters the space 149. This implies that the potential of the reference electrode 42 is less likely to change. Therefore, the resistance to a decrease in the oxygen concentration of the reference gas outside the sensor element 101 can be evaluated in accordance with the changeability of the voltage Vref. When a change in the voltage Vref does not exceed 50 mV even after 20 minutes, it is evaluated that the resistance to a decrease in the oxygen concentration of the reference gas outside the sensor element 101 is extremely high ("A"). When a change in the voltage Vref exceeds 50 mV after 15 minutes but within 20 minutes, it is evaluated that the resistance is high ("B"). When a change in the voltage Vref exceeds 50 mV before 15 minutes, it is evaluated that the resistance is low ("C"). Tests are performed similarly on the gas sensors 100 according to Examples 2 to 9 and Comparative Examples 1 to 3.

The results of Evaluation Tests 1 and 2 described above with regard to each of Examples 1 to 9 are indicated in Table 1. In Table 1, since Comparative Example 1 does not have the reference-gas introduction space 43, there are no values ("–") for the diffusion resistance Ra, A×Ra, and the volume ratio Cp/Ca.

TABLE 1

| | Current A [µA] | Diffusion Resistance Ra [/mm] | A × Ra | Exposed Area S [mm²] | Volume Ratio Cp/Ca | Porosity P [%] | Evaluation Test 1 | Evaluation Test 1 | Volume Cp [mm³] | Volume Ca [mm³] | Dimension of Reference-gas Introduction Layer Front Segment Thickness [mm] |
|---|---|---|---|---|---|---|---|---|---|---|---|
| Example 1 | 15 | 538 | 8070 | 26 | 0.24 | 10.0 | A | A | 1.3 | 5.4 | 0.03 |
| Example 2 | 5 | 538 | 2690 | 26 | 0.24 | 1.0 | A | A | 1.3 | 5.4 | 0.03 |
| Example 3 | 13 | 1076 | 13988 | 13 | 0.47 | 15.0 | A | A | 1.3 | 2.7 | 0.03 |
| Example 4 | 20 | 378 | 7560 | 18 | 0.27 | 13.0 | A | A | 1.0 | 3.8 | 0.03 |
| Example 5 | 20 | 538 | 10760 | 26 | 0.21 | 20.0 | A | A | 1.1 | 5.4 | 0.02 |
| Example 6 | 30 | 1345 | 40350 | 11 | 0.59 | 30.0 | A | B | 1.3 | 2.2 | 0.03 |
| Example 7 | 25 | 2000 | 50000 | 9 | 0.87 | 30.0 | B | B | 1.3 | 1.5 | 0.03 |
| Example 8 | 30 | 538 | 16140 | 26 | 0.23 | 30.0 | A | B | 1.2 | 5.4 | 0.03 |
| Example 9 | 18 | 219 | 3938 | 14 | 0.16 | 5.0 | A | A | 0.9 | 5.6 | 0.03 |
| Comparative Example 1 | 20 | — | — | 0 | — | 40.0 | F | A | 1.3 | 0.0 | 0.03 |
| Comparative Example 2 | 70 | 538 | 37660 | 26 | 0.24 | 40.0 | A | F | 1.3 | 5.4 | 0.03 |
| Comparative Example 3 | 20 | 3400 | 68000 | 8 | 1.67 | 30.0 | F | A | 1.3 | 0.8 | 0.03 |

| | Dimension of Reference-gas Introduction Layer | | | | | | | | Dimension of Reference-gas Introduction Space | | |
|---|---|---|---|---|---|---|---|---|---|---|---|
| | Front Segment | Rear Segment | | | Constricted Segmet | | | | | | |
| | Width [mm] | Length [mm] | Thickness [mm] | Width [mm] | Length [mm] | Thickness [mm] | Width [mm] | Length [mm] | Thickness [mm] | Width [mm] | Length [mm] |
| Example 1 | 2.26 | 7.17 | 0.03 | 0.5 | 52.6 | — | — | — | 0.2 | 0.5 | 53.80 |
| Example 2 | 2.26 | 7.17 | 0.03 | 0.5 | 52.6 | — | — | — | 0.2 | 0.5 | 53.80 |
| Example 3 | 2.26 | 7.17 | 0.03 | 0.5 | 52.6 | — | — | — | 0.2 | 0.25 | 53.80 |
| Example 4 | 2.26 | 7.17 | 0.03 | 0.5 | 36.6 | — | — | — | 0.2 | 0.5 | 37.80 |
| Example 5 | 2.26 | 7.17 | 0.03 | 0.5 | 52.6 | — | — | — | 0.2 | 0.5 | 53.80 |
| Example 6 | 2.26 | 7.17 | 0.03 | 0.5 | 52.6 | — | — | — | 0.2 | 0.2 | 53.80 |
| Example 7 | 2.26 | 7.17 | 0.03 | 0.5 | 52.6 | — | — | — | 0.2 | 0.18 | 54.00 |
| Example 8 | 2.26 | 6.7 | 0.03 | 0.5 | 52.6 | 0.03 | 0.50 | 0.49 | 0.2 | 0.5 | 53.80 |
| Example 9 | 2.26 | 7.17 | 0.03 | 0.5 | 28.8 | — | — | — | 0.2 | 0.8 | 35.00 |
| Comparative Example 1 | 2.26 | 7.17 | 0.03 | 0.5 | 53.8 | — | — | — | — | — | — |
| Comparative Example 2 | 2.26 | 7.17 | 0.03 | 0.5 | 52.6 | — | — | — | 0.2 | 0.5 | 53.80 |
| Comparative Example 3 | 2.26 | 7.17 | 0.03 | 0.5 | 52.6 | — | — | — | 0.1 | 0.15 | 51.00 |

As indicated in Table 1, in Comparative Example 2 in which the limiting current A exceeds 30 µA, the result of Evaluation Test 2 indicates "F" and the resistance to a decrease in the oxygen concentration of the reference gas outside the sensor element 101 is low. In contrast, in each of Examples 1 to 9 and Comparative Examples 1 and 3 in which the limiting current A is 30 µA or lower, the result of Evaluation Test 2 indicates "A" or "B" and the resistance to a decrease in the oxygen concentration of the reference gas outside the sensor element 101 is high. In particular, in each of Examples 1 to 5, 9 and Comparative Examples 1 and 3 in which the limiting current A is 20 µA or lower, the result of Evaluation Test 2 indicates "A" and the resistance to a decrease in the oxygen concentration of the reference gas outside the sensor element 101 is extremely high.

Furthermore, in each of Comparative Example 3 in which A×Ra exceeds 50,000 and Comparative Example 1 that does not have the reference-gas introduction space 43, the result of Evaluation Test 1 indicates "F" and the stabilization period is long. In contrast, in each of Examples 1 to 9 and Comparative Example 2 in which A×Ra is 50,000 or smaller, the result of Evaluation Test 1 indicates "A" or "B" and the stabilization period is short. In particular, in each of Examples 1 to 6, 8, and 9, and Comparative Example 2 in which A×Ra is 41,000 or smaller, the result of Evaluation Test 1 indicates "A" and the stabilization period is extremely short. The long stabilization period in Comparative Example 1 is conceivably due to water being diffusible outward only from the rear end surface of the reference-gas introduction layer 948 with the small area because the water cannot be diffused outward from the upper surface of the reference-gas introduction layer 948 due to the absence of the reference-gas introduction space 43.

It has been confirmed from the above results of Evaluation Tests 1 and 2 that, when the limiting current A is 30 µA or lower and A×Ra is 50,000 or smaller, the resistance to a decrease in the oxygen concentration of the reference gas outside the sensor element 101 is enhanced, and the stabilization period for the potential of the reference electrode 42 during the driving of the sensor element 101 is shortened. Furthermore, it is conceivable from the relationship between the exposed area S in Table 1 and the result of Evaluation Test 1 that the exposed area S is preferably 10 mm² or larger.

What is claimed is:

1. A sensor element comprising:
    an element body having an oxygen-ion-conductive solid electrolyte layer and provided with a measurement-object gas flow section therein, the measurement-object gas flow section introducing a measurement-object gas and causing the measurement-object gas to flow therethrough;
    a measurement electrode disposed in the measurement-object gas flow section;

a measurement-object-gas side electrode disposed on the element body such that the measurement-object-gas side electrode comes into contact with the measurement-object gas;

a reference electrode disposed inside the element body;

a reference-gas introduction section having a reference-gas introduction space and a porous reference-gas introduction layer, the reference-gas introduction space being open outward of the element body and introducing a reference gas serving as a reference for detecting specific gas concentration in the measurement-object gas into the element body, the porous reference-gas introduction layer covering the reference electrode and causing the reference gas to flow from the reference-gas introduction space to the reference electrode, the porous reference-gas introduction layer having a front segment and a rear segment, the front segment covering the reference electrode, the porous reference-gas introduction layer having a constricted segment located between the reference electrode and a part of the porous reference-gas introduction layer exposed to the reference-gas introduction space, wherein the constricted segment is located in the front segment; and a heater that heats the element body, wherein a limiting current A as a limiting current when oxygen is pumped out from a periphery of the reference electrode to a periphery of the measurement-object-gas side electrode is 30 µA or lower, wherein A×Ra as a product of a diffusion resistance Ra [/mm] of the reference-gas introduction space and the limiting current A is 50,000 or smaller, wherein an exposed area S as an area of the part of the porous reference-gas introduction layer exposed to the reference-gas introduction space is 10 $mm^2$ or larger, and wherein a volume ratio Cp/Ca of a volume Cp of the porous reference-gas introduction layer to a volume Ca of the reference-gas introduction space is 0.87 or lower.

2. The sensor element according to claim 1, wherein the limiting current A is 20 µA or lower.

3. The sensor element according to claim 1, wherein a porosity P of the porous reference-gas introduction layer is between 1% and 30% inclusive.

4. The sensor element according to claim 1, wherein A×Ra is 41,000 or smaller.

5. The sensor element according to claim 1, wherein the porous reference-gas introduction layer is formed from a plurality of materials.

6. A gas sensor comprising the sensor element according to claim 1.

* * * * *